US010992975B1

(12) United States Patent
Urgaonkar et al.

(10) Patent No.: US 10,992,975 B1
(45) Date of Patent: Apr. 27, 2021

(54) TECHNIQUES FOR SHORT BUFFER ADAPTIVE BITRATE STREAMING

(71) Applicant: Amazon Technologies, Inc., Seattle, WA (US)

(72) Inventors: Rahul Urgaonkar, Shoreline, WA (US); Satheesh Ramalingam, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/700,192

(22) Filed: Dec. 2, 2019

(51) Int. Cl.
| | |
|---|---|
| *H04N 21/2662* | (2011.01) |
| *H04N 21/472* | (2011.01) |
| *H04N 21/2187* | (2011.01) |
| *H04N 21/24* | (2011.01) |
| *H04N 21/231* | (2011.01) |
| *H04N 21/44* | (2011.01) |
| *H04N 21/2387* | (2011.01) |
| *H04N 21/234* | (2011.01) |

(52) U.S. Cl.
CPC ..... *H04N 21/2662* (2013.01); *H04N 21/2187* (2013.01); *H04N 21/231* (2013.01); *H04N 21/2387* (2013.01); *H04N 21/23406* (2013.01); *H04N 21/2401* (2013.01); *H04N 21/44004* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 5,677,969 A | * | 10/1997 | Auyeung | H04N 21/23406 358/1.9 |
| 2010/0014583 A1 | * | 1/2010 | Shimizu | H04N 19/177 375/240.05 |
| 2012/0265853 A1 | * | 10/2012 | Knox | H04N 21/2187 709/218 |
| 2014/0282769 A1 | * | 9/2014 | Salem | H04L 67/322 725/94 |

* cited by examiner

*Primary Examiner* — James R Marandi
(74) *Attorney, Agent, or Firm* — Kilpatrick Townsend & Stockton LLP

(57) ABSTRACT

Systems, methods, and computer storage media are described herein for optimizing adaptive bitrate streaming for content (e.g., streams of live events). Bitrate selections may be made based at least in part on the current state of the playback. When the playback is in a transient state (e.g., when the user has recently played or navigated within the content), bitrate selections may be determined utilizing a virtual buffer that simulates a playback buffer. The virtual buffer may be initialized with a predetermined fullness value. As content fragments are received and queued on the playback buffer, the fullness values for the virtual buffer and the playback buffer may be adjusted differently. When the fullness of the playback buffer exceeds the virtual buffer, subsequent bitrate selections may be determined utilizing the playback buffer. The virtual buffer may be utilized to simulate a steady state playback buffer while the playback buffer populates.

20 Claims, 8 Drawing Sheets

TECHNIQUES FOR SHORT BUFFER ADAPTIVE BITRATE STREAMING

BACKGROUND

It has become commonplace for users to stream content online. Instead of downloading an entire video before enabling playback, streaming allows a user to begin playback within seconds. As the content is presented for playback at the user device, additional content fragments are requested from the content source. Adaptive bitrate streaming is a technique that detects the user's bandwidth and CPU capacity in real time and adjusts the quality of those content fragments accordingly. The content being streamed may be encoded in a variety of bitrates and a particular bitrate may be selected based at least in part on a playback buffer's size and the current network behavior. However, existing adaptive bitrate (ABR) algorithms face significant challenges in estimating future network behavior and/or buffer size. ABR algorithms attempt to maximize the video quality (e.g., by picking the highest bitrate available) while minimizing the amount of buffering events that occur if the playback buffer is empty. Selecting the optimized bitrate in light of current network bandwidth and buffer size becomes even more challenging when the content is a live video and the buffer is relatively small, perhaps storing only a limited amount of the content (e.g., the next ten seconds of video, etc.). Current ABR algorithms are not optimized for small buffers and playback of live events. Embodiments described herein address these issues individually and collectively.

BRIEF DESCRIPTION OF THE DRAWINGS

Various embodiments in accordance with the present disclosure will be described with reference to the drawings, in which.

DETAILED DESCRIPTION

Figure 1:
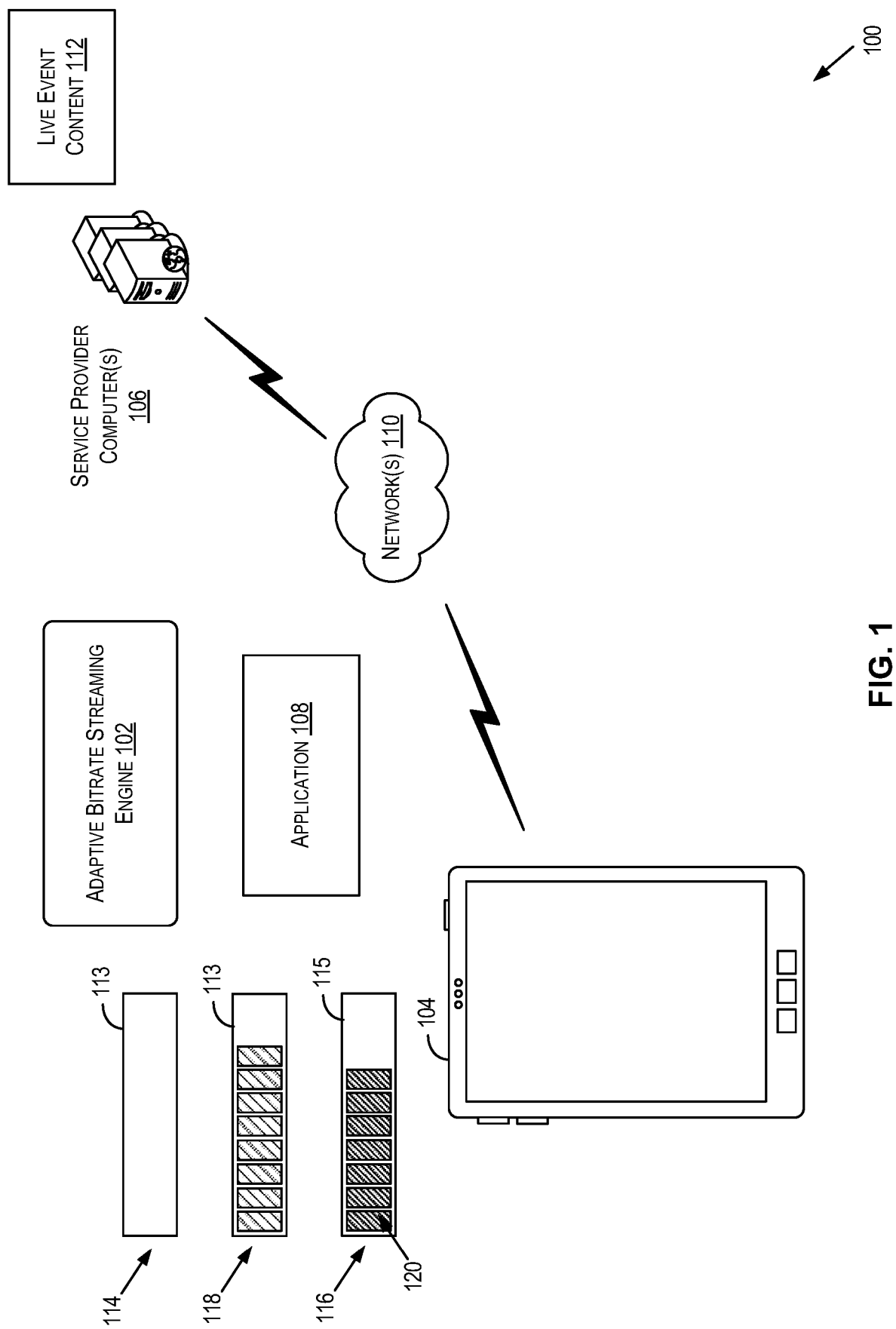
FIG. 1 illustrates an exemplary environment for providing optimized adaptive bitrate streaming utilizing an adaptive bitrate streaming engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to providing adaptive bitrate streaming utilizing an adaptive bitrate streaming algorithm and a virtual buffer. "Adaptive bitrate streaming" refers to a technique in which content (e.g., a video) is encoded in a variety of bitrates and segmented into fragments (e.g., two second fragments, three second fragments, etc.). The streaming client is made aware of the available streams offered at the differing bit rates and segments of the stream by a manifest file. Fragments provided at a higher bitrate may offer a higher quality resolution than fragments corresponding to a lower bitrate. Higher bitrate fragments are larger in size than their lower bitrate counterparts, as higher quality data requires a greater amount of data. Accordingly, the higher the bitrate, the more network bandwidth is needed to download a fragment in time for playback. In some examples, a "playback buffer" is a storage container configured to store any suitable number of content fragments for subsequent playback at a user device.

Existing adaptive bitrate algorithms have difficulty estimating future bandwidth as network conditions can vary significantly over time. Conventionally, when content is streamed, a playback buffer is utilized to determine what bitrate should be utilized. ABR algorithms attempt to maximum video quality by picking the highest bitrate that the network can support while also minimizing buffering time that may be experienced if the playback buffer is allowed to empty entirely (e.g., when the playback occurs faster than new content fragments are downloaded). However, these algorithms determine bitrates for subsequent fragments based on the current buffer fullness. This can be problematic when the playback buffer has not yet populated and normalized as would be the case for some period of time after playback commenced or a seek event (e.g., a fast forward, rewind, etc.) was received. To identify subsequent bitrates based on the playback buffer during this time period can increase the risk that suboptimal bitrates may be selected.

Techniques discussed herein provide improvements over conventional streaming systems by providing a virtual buffer that may be initialized to simulate a relatively populated playback buffer while the actual playback buffer is populating during this time period after playback commenced. The fullness of the virtual buffer may be artificially adjusted to simulate playback buffer behavior. These adjustments may occur in response to received content fragments, download cancellations, due to the progress of time, and the like. By utilizing the virtual buffer discussed herein, drastic fluctuations in bitrate selections may be avoided while the playback buffer is initially populating which can decrease the risks of providing unnecessarily low quality content and/or causing unnecessary buffering. The system can detect when the playback buffer has stabilized and bitrate selection processing may shift to utilize the playback buffer, rather than the virtual buffer, as the playback buffer fluctuates based at least in part on actual network and playback conditions.

Another innovative aspect of the techniques disclosed herein is the manner in which a goodness value is identified for each available bitrate in the manifest. A bitrate that has the highest goodness value may be selected. The goodness value may be calculated based at least in part on (1) a logarithmic term that takes the logarithm of a bitrate value, (2) a negative linear term that is the current buffer size, and (3) a ratio term that is the fragment size for the given bitrate. Utilizing these particular terms allows the techniques disclosed herein to be highly effective, especially for live event streaming. This is partly due to the utilization of logarithms which more closely model the subjective perceived visual quality by an end user where the increase in quality is known to be sub-linear in the fragment bitrate. That is, when doubling the bitrate is known to not necessarily result in doubling of the visual quality of a video fragment. The combination of the logarithmic and linear terms enable the system to carefully balance quality versus the risk of re-buffering. Finally, taking the actual fragment size into account when calculating the goodness value for each bitrate enables the system to make better bitrate decisions (e.g., resulting in overall higher quality and/or reduced buffering) than currently known buffer based approaches (such as BBA) that use simple linear functions.

According to some embodiments, a user may select content to be streamed. The content may be selected via an interface provided by an adaptive bitrate streaming (ABS) engine. In some embodiments, the ABS engine may execute as part of an application (e.g., a web browser, a content streaming application, etc.) hosted by a streaming service. The streaming service may be configured to provide any suitable content (e.g., videos, audio content, podcasts, etc.). By way of example, the streaming service may provide content corresponding to an event (e.g., a live sporting event, a live public debate, or any suitable event that is prerecorded or broadcast live). In some embodiments, the streaming service may provide an electronic content catalog from which the user may select the desired content. Once selected, the user may utilize any suitable user option (e.g., a button, a link, or any suitable user interface element) to play the content at the user device. During playback, a number of additional user options (e.g., fast forward, rewind, repeat last 10 seconds, forward 10 seconds, etc.) for navigating to a different run time within the content may be provided.

The ABS engine may be configured to detect when the user makes a selection to play the content. In some embodiments, while a buffer used for playback (referred to as a "playback buffer") is populated with content fragments, the ABS engine may utilize a virtual buffer for a period of time to select bitrates for subsequent content fragments. The virtual buffer, in some embodiments, is a hypothetical storage container associated with a modifiable fullness value that is adjustable by the ABS engine. In some embodiments, the virtual buffer and the playback buffer may have the same capacity. In some embodiments, the ABS engine may initialize the virtual buffer as having a predetermined fullness value. In some embodiments, the predetermined value may be a value (e.g., 7 within a range 0-10) that indicates a portion (e.g., 70% of total capacity) of the virtual buffer is full (or that the virtual buffer hold some amount of data such as 7 seconds worth of content). Any suitable value or indicator may be utilized to indicate any suitable amount of the hypothetical virtual buffer is full.

For some period of time following selection of a "play" user option or a "navigate" user option (also referred to as a "seek option"), the ABS engine may consider the application as operating in a first state (e.g., a transient state). The first state may correspond to a time period during which the playback buffer has likely not been populated to at least a threshold amount of data (e.g., at least 50% of total capacity). Because the playback buffer is in the course of populating itself to at least the threshold amount, bitrate selections may be selected based at least in part on the virtual buffer instead of the playback buffer. The ABS engine may further utilize the virtual buffer to simulate the behavior of the playback buffer, while at the same time, ensuring that the fullness value associated with the virtual buffer increases to a lesser extent than the playback buffer in response to the same stimuli (e.g., in response to completing a fragment download, in response to cancelling a fragment download, in response to a time period elapsing since the last download was reviewed, etc.).

In some embodiments, the application may be configured to perform two processes prior to requesting each content fragment. One process may be associated with selecting a bitrate from a set of bitrates. A "bitrate," in some examples, is an amount of data encoded in a single second of content. Bitrate directly affects both the quality and file size of the content being streamed. The set of bitrates may include any suitable number of bitrates corresponding to the bitrates in which the content selected by the user is encoded. As a non-limiting example, particular content selected by the user may be encoded in five different bitrates: BR1, BR2, BR3, BR4, and BR5. Bitrates BR1 to BR5 may differ from one another, where BR1 is the greatest bitrate corresponding to the best quality and largest content fragment available. BR2-BR5 may be associated with increasingly lower quality bitrates and smaller content fragments, with BR5 having the lowest quality bitrate and smallest content fragments. The different versions of the content corresponding to the different bitrates may be stored by the source of the content and content fragments of different bitrates may be provided upon request. It should be appreciated that any suitable number of bitrates may be utilized and that five is used for illustrative purposes only. Example bitrates may include 1.2 Mbps, 9.5 Mbps (e.g., corresponding to 720p resolution video), 15 Mbps (e.g., corresponding to 1080p resolution video), 30 Mbps (e.g., corresponding to 1440p (2 k) resolution video), and 66-85 Mbps (e.g., corresponding to 2160p (4 k) resolution video), although any suitable bitrate may be utilized in a similar manner as described herein.

When a new content fragment is to be requested (e.g., after a previously-received fragment is downloaded, at the start of playback or a seek event, etc.) the ABS engine may be configured to execute a bitrate selection process. The ABS engine may be configured to determine a current state of the playback of the content occurring at the user device. In some embodiments, the playback may be considered to be in a first state (e.g., a "transient state") for some period of time after an option to play back the content is selected or after a seek event is detected. By way of example, the playback may be deemed to be in a transient state for ten seconds after the user selects a playback option to play the content at the device. In some embodiments, the playback may be determined to be in a transient state further based at least in part on fullness values corresponding to the virtual buffer and the playback buffer. That is, the playback may be considered to be in the first state (e.g., the transient state) if the playback option was selected less than 10 seconds before the current time or so long as the virtual buffer's fullness value exceeds the fullness value corresponding to the playback buffer. For example, immediately after the playback option is selected, the virtual buffer may be initialized to with a fullness value (e.g., a value of 0.7, 7, or any suitable value) that indicates a portion (e.g., 70% of total capacity) of the buffer is full. The fullness value of the playback buffer may indicate the playback buffer is filled with an amount of data (e.g., no data) that is less than the amount of data indicated by the fullness value of the virtual buffer.

While in the transient state, the ABS engine may utilize the fullness value of the virtual buffer to calculate a goodness value for each of the available bitrates. In some embodiments, the ABS may first calculate two variables referred to as "V" and "gamma." The V and gamma variables may be utilized in the calculation of goodness values for each of the available bitrates. These variables may be calculated utilizing any suitable data such as a run time of the event, an amount downloaded of a current fragment being downloaded, a fragment size, a fragment index, a first fullness value of the virtual buffer, a lower threshold of the virtual buffer, a set of available bitrates, or the like. The ABS engine may rank the set of bitrates according to the calculated goodness scores. In some embodiments, a highest goodness score may indicate the best bitrate to select under the current circumstances. It should be appreciated that the goodness scores may be numeric or otherwise, and may indicate in any suitable manner a degree of goodness by which the ABS engine may rank the bitrates in order to select a best bitrate from the set. Once selected, the ABS engine may request, from a source of the content, that the next content fragment be provided in the bitrate selected.

In addition to requesting the next content fragment, once the best bitrate is selected, the ABS engine may execute a process for reviewing download progress (RDP). During a RDP process, the ABS engine may identify a bitrate of a fragment that is currently being downloaded. If the bitrate associated with the requested content fragment is not the same as the bitrate associated with the content fragment being downloaded, the ABS engine may cancel the download and request that the canceled fragment be provided in accordance with the selected bitrate. The source of the content may transmit a content fragment corresponding to the canceled download and the selected bitrate as requested. In some embodiments, the request to retransmit a content fragment in a different bitrate may include an index associated with the content fragment and an indication of the requested bitrate.

Downloaded content fragments may be added to the playback buffer in download order to queue the fragments for playback at the user device. Accordingly, in some embodiments, the playback buffer may utilize a first in, first out, approach to organize the content fragments for playback, although any suitable scheme for storing the fragments while preserving playback order may be utilized. The ABS engine may be configured to track fragment downloads, download cancellations, and time elapsed since execution of the last RDP process. In some embodiments, when a fragment download completes, the fragment may be added to the playback buffer for later playback. Each fragment may be retrieved from the playback buffer and played at the user device in the order in which they were downloaded. When a fragment is downloaded, the duration of the fragment, or a portion thereof, may be added to the virtual buffer fullness value. By way of example, if the fullness value simulates an amount of data x (e.g., x seconds of data) stored in the virtual buffer, and a content fragment of duration y (e.g., y seconds of data), size y may be added to amount x and the resultant value z may be divided by a total capacity (e.g., total t seconds) of the virtual buffer to calculate a new fullness value for the virtual buffer. In some embodiments, the full fragment size may be added to an amount corresponding to the fullness value and the resultant value may be divided by a total capacity of the buffer to determine a new fullness value for the virtual buffer if playback has not been started and there was no cancellation. However, if playback of the fragment has started or if there was a cancellation in the RDP process, only half of the fragment duration may be added to the amount corresponding to the fullness value before dividing the resultant value by the total capacity of the virtual buffer. By adding only half of the duration of the fragment duration to the virtual buffer, even though the entire fragment is added to the playback buffer, ensures that the fullness value (e.g., corresponding to the total duration of all of the fragments) of the playback buffer will eventually exceed the fullness value of the virtual buffer. In some embodiments, the virtual buffer may be associated with a maximum threshold that limits the fullness value.

When the ABS engine determines that the fullness value of the playback buffer exceeds the fullness value of the virtual buffer, the ABS engine may determine that playback is in a steady state. While in a steady state, bitrate selection may be determined based at least in part on the playback buffer instead of the virtual buffer. Thus, utilizing the virtual buffer and its corresponding fullness value enables more reasonable bitrate selections (e.g., selections that conform to most likely network conditions) are determined while the playback buffer populates with content fragments. If the virtual buffer was not utilized, bitrate selections may be suboptimal given the relatively large space initially available in the playback buffer immediately following.

FIG. 1 illustrates an exemplary environment 100 for providing optimized adaptive bitrate streaming utilizing an adaptive bitrate streaming engine 102, in accordance with at least one embodiment. The environment 100 may include a user device 104 and service provider computer(s) 106. Application 108 (e.g., a content player application, a web browser application, etc.) may execute on the user device 104. The application 108 may be configured to communicate with the service provider computer(s) 106 via network(s) 110. In some embodiments, network(s) 110 may be any suitable communications network such as a wide area network (e.g., the Internet), a local area network, and/or a cellular network, to name a few. The service provider computer(s) 106 may be configured to host an electronic catalog of content including the live event content 112.

In some embodiments, the live event content 112 may include content metadata corresponding to an event that is being/will be broadcasted live (e.g., as the event, such as a sporting event, is occurring). It should be appreciated that additional instances of content may be included in the electronic catalog. These additional instances of content may correspond to the same live event or the additional instances of content may correspond to different events. Some content of the electronic catalog may correspond to content (e.g., a video and/or audio) that is prerecorded and does not correspond to a live event. In some embodiments, the live event content 112 may include any suitable number of subsets of content fragments (e.g., video and/or audio fragments) corresponding to a portion (e.g., 2 seconds, 3 seconds, 1 second, etc.) of the live event. The content fragments may reference an index number that indicates an order (a sequence) in which the content fragments are to be played at the user device 104. Although user device 104 is depicted as a tablet computer, it should be appreciated that the user device 104 can be any suitable electronic device capable of playing the live event content 112 and presenting the user interfaces hosted by the service provider computer(s) 106.

In some embodiments, one or more user interfaces hosted by the service provider computer(s) 106 may be accessed via the application 108. By way of example, a user interface may be utilized to search and/or select an option (referred to as a "playback option") to play back the live event content 112. Once selected, the application 108 (e.g., the adaptive bitrate streaming (ABS) engine 102 executing as part of the application 108) may be configured to request content metadata including a current run time associated with the live event content 112 from the service provider computer(s) 106. A current run time corresponding to the live event in real time may be referred to herein as the "live head". The live head of the event may be utilized to initialize the current run time of the live event content 112 at the application 108 (referred to herein as the "application head"). By way of example, the application head may be initialized to 0:00:00 or the like when the application 108 is to play the live event content 112 from the beginning (e.g., the playback option is selected before the live event starts or at substantially the same time as the beginning of the live event). If the live event has already started, the live head (e.g., the run time of the live event in real time) may be utilized to initialize the application head at the application 108. In some embodiments, the service provider computer(s) 106 may additionally provide an index number corresponding to an index of a content fragment that is available and closest to the live head. In some embodiments, the service provider computer(s) 106 may provide data (e.g., a manifest file) that indicates that the live event content 112 is available in a variety of bitrates corresponding to a set of bitrates (e.g., 5 differing bitrates). The set of bitrates may include any suitable number of bitrates.

Once the application head has been initialized with the application head and/or the index, the ABS engine 102, executing as part of the application 108, may be configured to perform a process for bitrate selection and a process for reviewing download progress. The process for bitrate selection may include selecting a bitrate from the set of bitrates available for the live event content 112. As a non-limiting example, the set of bitrates may include 1.2 Mbps (BR1), 9.5 Mbps (BR2), 15 Mbps (BR3), 30 Mbps (BR4), and 66-85 Mbps (BR5), although any suitable bitrate may be utilized in a similar manner as described herein. Prior to playback commencement, a playback buffer 113 managed by the ABS engine 102 may initially be empty as depicted at 114 (e.g., a fullness value corresponding to the playback buffer 113 may equal 0, indicating there is no data in the playback buffer 113). In some embodiments, the ABS engine 102 may initialize a fullness value corresponding to virtual buffer 115 to a predefined value (e.g., 7, corresponding to an amount of data equal to 70% of the total capacity of the virtual buffer) as depicted at 116. The fullness value may be predefined or the fullness value may be user configurable (e.g., via an interface provided by the ABS engine 102 and provided via the application 108. The fullness value of the virtual buffer 115 may simulate an amount of data being stored in the virtual buffer 115. For example, a fullness value of 7 may indicate that the virtual buffer 115 (e.g., a simulated buffer) is 70% full (or has an amount of data equal to 70% of the total capacity of the virtual buffer) or that the virtual buffer 115 has some amount of data stored (e.g., 7 seconds of content, or the like). It should be appreciated that the virtual buffer 115 may be represented as a parameter that is adjustable by the ABS engine 102 and may not include actual storage of any content fragments. In contrast, the playback buffer 113 (depicted at 114 and 118) may be a storage container that is configured to store any suitable number of content fragments. The playback buffer 113 and the virtual buffer 115 may be associated with the same total capacity (e.g., a maximum data size of the playback buffer 113). Although the content fragments depicted at 116 and 118 (e.g., fragment 120) are depicted as being roughly the same size, it should be appreciated that the actual data size of content fragments stored in the playback buffer 113 (and simulated as being stored at the virtual buffer 115) may vary from one another depending on the bitrate utilized to encode each fragment.

In operation, prior to requesting a content fragment, the ABS engine 102 may perform a process for selecting the bitrate for the content fragment to be requested. In general, the ABS engine 102 may calculate a goodness value for each of the set of bitrates. An example of this calculation will be discussed in further detail with respect to FIG. 2. The ABS engine 102 may rank each of the set of bitrates according to the goodness values. By way of example, in some embodiments, a highest goodness value may indicate a preferred bitrate while incrementally lower goodness values may indicate incrementally lessening preferences. The ABS engine 102 may utilize the highest goodness value (or another suitable indication of a preferred bitrate) to request that the next content fragment provided by the service provider computer(s) 106 correspond to the requested bitrate. The ABS engine 102 may utilize the fullness value corresponding to the virtual buffer 115 to calculate goodness values when the playback of the live event content 112 is identified as being in a transient state. Playback may be identified as being in a transient state when selection of the playback option (or the seek event) occurred within a threshold period of time (e.g., within 5 seconds, within ten seconds, etc.) of the current time until the fullness value of the playback buffer 113 exceeds the fullness value of the virtual buffer 115.

In some embodiments, the request transmitted to the service provider computer(s) 106 may indicate the selected bitrate. In some embodiments, the request may additionally include the current application head and/or index corresponding to the requested content fragment. The process for selecting a bitrate for a content fragment may be performed at any suitable time. In some embodiments, the process for selecting the bitrate for the next content fragment may be performed after a previous download of a content fragment completes and/or at the start of a session (e.g., after the playback option is selected via a user interface presented by the application 108), and/or after a seek event (e.g., after a seek option such as rewind, fast forward, repeat 10 seconds, forward 10 seconds, etc. is selected via a user interface presented by the application 108).

In some embodiments, the ABS engine 102 may be further configured to perform a process for reviewing download progress (RDP). During performance of the RDP process, the progress of an ongoing download may be identified. In some embodiments, the ABS engine 102 may be configured to maintain a manifest file indicating a bitrate for each content fragment downloaded for the content to date. The manifest file may indicate, as an example, that a content fragment corresponding to index 1 (e.g., a first content fragment) and BR 3 was previously requested and amount of the content fragment that has already been downloaded. An entry for each content request may be added to the manifest file at the time of the request, or at any suitable time. The entry may be updated throughout the content fragment download process to indicate how much of the content fragment has been downloaded and/or whether the download is complete. In some embodiments, if the download of a content fragment has yet to complete, and the bitrate selected for the next content fragment is different from the bitrate of the content fragment currently being downloaded, the ABS engine 102 may be configured to cancel the download and request the canceled content fragment be provided in accordance with the selected bitrate. The a different content fragment may be provided that corresponds to the bitrate requested. If a content fragment is not currently being downloaded, the ABS engine 102 may simply request, from the service provider computer(s) 106, that the next content fragment be provided in accordance with the selected bitrate.

Downloaded fragments may be added to the playback buffer in order to queue the fragment for playback at the user device 104. The ABS engine 102 may be configured to track fragment downloads, download cancellations, and time elapsed since execution of the last RDP process. In some embodiments, when a fragment download completes, the fragment may be added to the playback buffer 113 for later playback. Each fragment may be retrieved from the playback buffer 113 and played at the user device in the order in which they were downloaded. When a fragment is download, the fragment size, or a portion thereof may be added to the virtual buffer fullness value and the resultant value divided by the capacity of the virtual buffer to calculate a new fullness value.

By way of example, the fullness value of the virtual buffer may be initialized to 7 (e.g., simulating the virtual buffer being filled with an amount of data equal to 70% of total capacity) as depicted at 118. The ABS engine 102 may be configured to simulate playback buffer behavior using the fullness value of the virtual buffer. By way of example, if the fullness value of the virtual buffer 115 is initialized to 7 simulating the virtual buffer 115 being 70% full, and download of a two second fragment completes, then the size of the 2 second content fragment may be added to the fullness value and divided by the virtual buffer's total capacity to obtain the new fullness value. The downloaded fragment (e.g., content fragment 120) may be stored in the playback buffer 113 for subsequent playback and the fullness value of the playback buffer 113 may be increased to correspond to the addition of the content fragment 120. If playback has already commenced before the RDP process is executed, then only half of the fragment size may be added to the fullness value of the virtual buffer 115 before dividing the resultant value by the capacity of the virtual buffer 115. The corresponding fullness values of the virtual buffer 115 and playback buffer 113 may be tracked by the ABS engine 102.

When the ABS engine determines that the fullness value of the playback buffer 113 exceeds the fullness value of the virtual buffer 115 as depicted at 116 and 118, the ABS engine may determine that playback is in a steady state. While in a steady state, bitrate selection may be determined based at least in part on the fullness value of the playback buffer 113 rather than utilizing the fullness value of the virtual buffer 115. Thus, utilizing the virtual buffer 115 and its corresponding fullness value while in a transient state causes more reasonable bitrate selections to be made (e.g., bitrate selections that are more likely to conform to actual network conditions even though the actual network conditions are unknown) are determined while the playback buffer populates with content fragments. If the virtual buffer was not utilized, bitrate selections may be suboptimal given the relatively large space initially available in the playback buffer immediately following.

Figure 2:
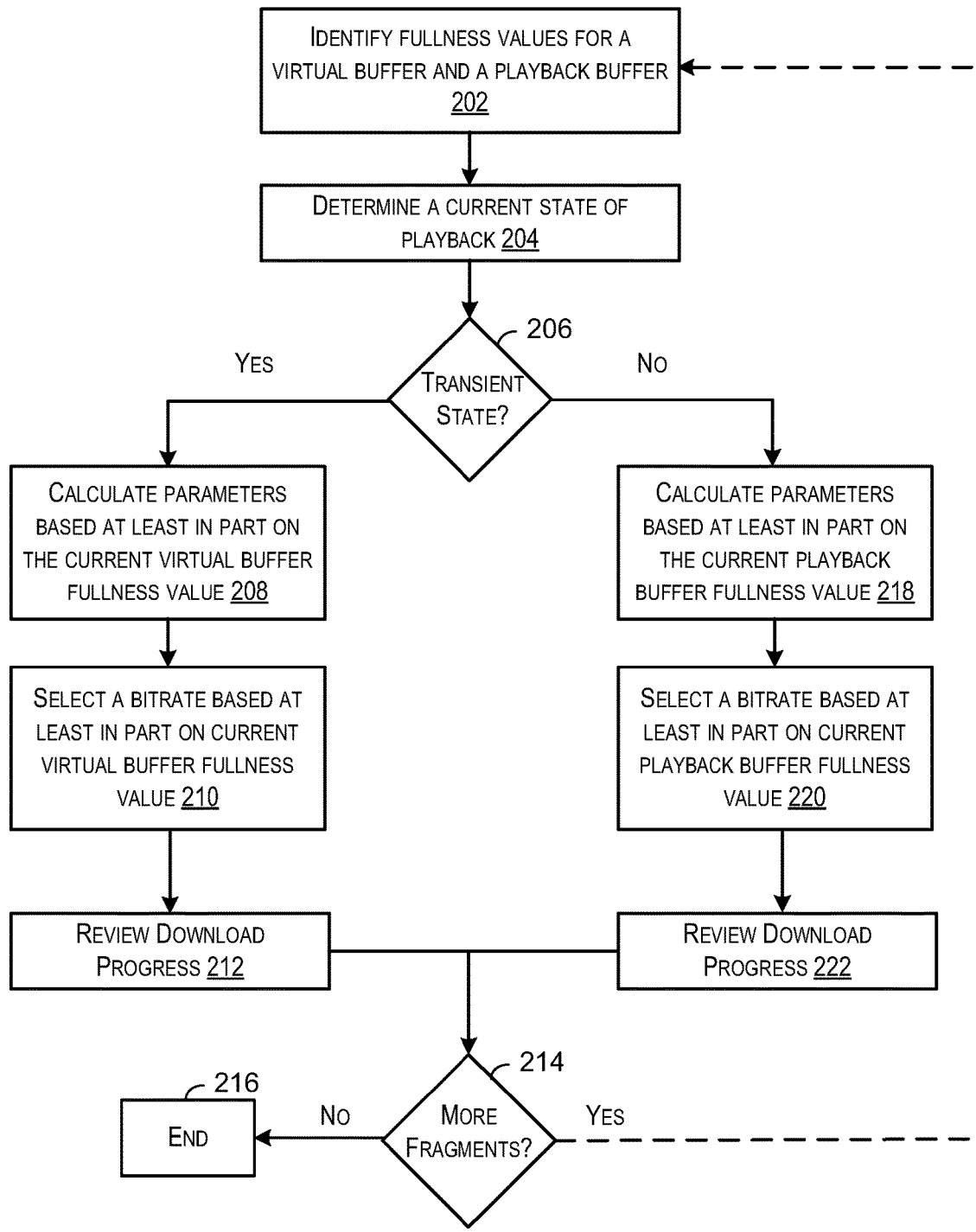
FIG. 2 illustrates an exemplary process for utilizing a virtual buffer and a playback buffer for optimized adaptive bitrate streaming, in accordance with at least one embodiment.

FIG. 2 illustrates an exemplary process 200 for utilizing a virtual buffer (e.g., the virtual buffer 115 of FIG. 1) and a playback buffer (e.g., the playback buffer 113 of FIG. 1) for optimized adaptive bitrate streaming, in accordance with at least one embodiment. The process may be performed by the ABS engine 102 of FIG. 1. The process 200 may begin at block 202 where a first fullness value for a virtual buffer (e.g., the virtual buffer 115) and a second fullness value for a playback buffer (e.g., the playback buffer 113) may be identified. In some embodiments, the first fullness value may be identified by one component of the ABS engine 102, while the second fullness value may be identified by a different component of the ABS engine. In some embodiments, these fullness values can be identified by the same component of the ABS engine 102. The first and second fullness values may quantify an amount of data (in any suitable units of data size and/or time) stored within the corresponding buffers. In the case of the virtual buffer 115, the fullness value may simulate an amount of data (e.g., 7 MB, 7 seconds of content, etc.) being stored at the virtual buffer rather than actual storage. In some examples, a fullness value may indicate a percentage (e.g., 50%, 65%, etc.) of a total capacity of the buffer that is currently utilized to store (or simulate storage of) content fragments. In some embodiments, the virtual buffer 115 may be initialized to a predefined value (e.g., a data size and/or time value equivalent to 70% of total capacity), while the playback buffer 113 may be initialized as being empty (e.g., having a data size and/or time value indicating no data is currently stored in the playback buffer 113).

At block 204, the ABS engine 102 may determine a current state of playback. By way of example, the ABS engine 102 may identify a time corresponding to a most-recent selection of a playback user option or a most-recent selection of a seek user option (e.g., a fast forward option, a rewind option, a repeat ten seconds option, a forward ten seconds option, etc.). The ABS engine 102 may be further configured to determine whether the fullness value of the playback buffer exceeds the fullness value of the virtual buffer. If the time corresponding to the most-recent selection of the user option is within a threshold time period (e.g., indicating the selection occurred less than 5 seconds ago, less than ten seconds ago, etc.) the ABS engine 102 may identify the current state of playback as being a transient state. If the fullness value of the playback buffer 113 does not exceed the fullness value of the virtual buffer, then the current state of playback may be identified as the transient state.

At decision point 206, the ABS engine 102 may determine whether the current state of playback is the transient state. If the current state is the transient state, then the process 200 may proceed to block 208. It should be appreciated that, when the transient state was entered (e.g., upon detection of selection of a user option such as a playback option or a seek option) a simulation timer may have been started (not depicted).

At block 208, parameters V and γ may be calculated based at least in part on the current fullness value of the virtual buffer. In some examples, V may be computed by the following three formulas:

$$V = \frac{\text{content}_{head} - \text{playback}_{head} + (1+p)*(VB_{fVal} - V_{thresh})}{\log\left(\frac{HQ_{Bitrate}}{LQ_{Bitrate}}\right) + \log\left(\frac{SLQ_{Bitrate}}{LQ_{Bitrate}}\right) * \frac{f_{size}(LQ_{Bitrate})}{f_{size}(SLQ_{Bitrate}) - f_{size}(LQ_{Bitrate})}}$$

where $\text{content}_{head}$ is the current run time of the content being streamed (e.g., a live event occurring in real time), $\text{playback}_{head}$ is the current run time of the content being presented for playback at the user device, p is a predefined value $VB_{fVal}$ is the fullness value of the virtual buffer, $V_{thresh}$ is a lower threshold value associated with the virtual buffer, $HQ_{Bitrate}$ is the highest quality bitrate of the set of available bitrates, $LQ_{Bitrate}$ is the lowest quality bitrate of the set of available bitrates, $SLQ_{Bitrate}$ is the second lowest quality bitrate of the set of available bitrates, and $f_{size}(n)$ is the fragment size of (n).

In some embodiments, γ may be calculated according to the following formula:

$$\gamma = \frac{content_{head} - playback_{head} + (1+p)*(VB_{fVal})}{V} - \log\left(\frac{HQ_{Bitrate}}{LQ_{Bitrate}}\right)$$

where $content_{head}$ is the current run time of the content being streamed (e.g., a live event occurring in real time), $playback_{head}$ is the current run time of the content being presented for playback at the user device, p is a predefined value $VB_{fVal}$ is the fullness value of the virtual buffer, $HQ_{Bitrate}$ is the highest quality bitrate of the set of available bitrates, and $LQ_{Bitrate}$ is the lowest quality bitrate of the set of available bitrates.

At block 210, the ABS engine 102 may perform a process for bitrate selection. The bitrate may be determined based at least in part on the current virtual buffer fullness value. For example, for each bitrate in the set of bitrates available (e.g., as identified by the source of the content) a goodness value may be computed. In some embodiments, the goodness value may be computed for each bitrate x of the set of bitrates using the follow formula:

$$GVal(x) = \frac{\left(V*\left(\log\left(\frac{x}{LQ_{Bitrate}}\right)+\gamma\right)-(1+p)*VB_{fVal}\right)}{f_{size}(x)}$$

where GVal(x) is the goodness value for the bitrate x, V and γ are calculated using the formulas described above, $LQ_{Bitrate}$ is the lowest quality bitrate of the set of available bitrates (e.g., a set of bitrates in which the content is available), p is a predefined value $VB_{fVal}$ is the fullness value of the virtual buffer, and $f_{size}(x)$ is the fragment size (e.g., in byes) of bitrate x. In some embodiments, the ABS engine 102 may rank the set of bitrates according to the goodness values corresponding to each bitrate. A best goodness value (e.g., a highest goodness value in a ranking scheme in which higher values indicate better goodness value) may be selected. If there is no highest goodness value, than the highest bitrate may be selected by default.

At block 212, the ABS engine 102 may perform a process for reviewing download progress. In some embodiments, a goodness value for the original bitrate (e.g., the bitrate currently being utilized to download a fragment) may be calculated as follows:

$$GVal(Orig_{Bitrate}) = \frac{\left(V*\left(\log\left(\frac{Orig_{Bitrate}}{LQ_{Bitrate}}\right)+\gamma\right)-(1+p)*VB_{fVal}\right)}{f_{size}(Orig_{Bitrate})*\max\left(1-completed_{ratio},\frac{1}{3}\right)}$$

where $GVal(Orig_{Bitrate})$ is the goodness value of the original bitrate, V and γ are calculated as described above, p is a predefined value $VB_{fVal}$ is the fullness value of the virtual buffer, $f_{size}(x)$ is the fragment size (e.g., in byes) of bitrate x, $completed_{ratio}$ is the ratio of completed downloads to incomplete downloads, and max(f, 1) selects the maximum off or 1.

In some embodiments, each of the bitrates that are lower bitrates than the original bitrate may be obtained (e.g., from the formulas discussed above). In some embodiments if the goodness value of a given bitrate x divided by the goodness value of the original bitrate is greater than 1 plus an abandonment threshold, then bitrate x may be eligible for replacing the original download. Said another way, if $$\frac{GVal(x)}{GVal(Orig_{Bitrate})} > (1+abandon_{threshold}),$$

then the bitrate x may be utilized to replace the original download. If multiple bitrates can be utilized, a highest goodness value of those bitrates may be selected. In these examples, the ABS engine 102 may be configured to cancel the original download and request, from a source of the content, the content fragment corresponding to the canceled download and the bitrate selected. Else, the download can proceed uninterrupted.

It should be appreciated that the ABS engine 102 may, during performance of block 212 (or at any suitable time) may modify the fullness value corresponding to the playback buffer and/or the virtual buffer. By way of example, when a fragment downloads, the size of the fragment may be added to the playback buffer and its fullness value may be updated. In some embodiments, the By way of example, every time block 212 is performed, the ABS engine 102 may decrement the fullness value of the virtual buffer according to the time elapsed since the last time the process for reviewing download progress was performed to simulate playback during that period. In some embodiments, whenever a fragment download is canceled, the time taken to finish downloading the fragment at the new bitrate is decremented from the fullness value of the virtual buffer to simulate playback during that period. When a fragment finishes download, the fragment duration is added to the virtual buffer size. Specifically, the full fragment duration may be added if playback has not yet started and there was no cancellation. In some embodiments, if playback has started or if there was a cancellation in the RDP process, only half of the fragment duration may be added. The virtual buffer's fullness value may be restricted to be within a range of a minimum value (e.g., 0) and a maximum value (e.g., live_head−download_head+current virtual buffer fullness value).

It should be appreciated that the parameters and goodness values discussed above at 208-212 are calculated based at least in part on (1) a logarithmic term that takes the logarithm of a bitrate value, (2) a negative linear term that is the current buffer size, and (3) a ratio term that is the fragment size for the given bitrate. Utilizing these particular terms allows the techniques disclosed herein to be highly effective, especially for live event streaming. For example, utilizing logarithms allow the functions described above to more closely model the subjective perceived visual quality by an end user where an increase in quality is known to be sub-linear to the fragment bitrate. That is, when doubling the bitrate does not necessarily result in doubling of the visual quality of a video fragment. The combination of the logarithmic and linear terms above allow the ABS engine 102 carefully balance quality versus the risk of re-buffering. By utilizing the actual fragment size when calculating the goodness value for each bitrate the system can make better bitrate decisions (e.g., resulting in overall higher quality and/or reduced buffering) than currently known buffer based approaches (such as BBA) that use simple linear functions.

At decision point 214, it may be decided whether there are more content fragments to be requested. If there are more content fragments (e.g., an index of the current content fragment does not equal an index value corresponding to a last fragment), then the process may return to block 202 where current fullness values for the virtual buffer and the playback buffer may be identified. Alternatively, if there are no more content fragments to be requested, the process 200 may end at 216.

At any suitable time, a result of decision point 206 may indicate that the current state of the playback is in a steady state. In some embodiments, the current state of playback may be considered in a steady state when the fullness value of the playback buffer exceeds the fullness value of the virtual buffer. When the current state is determined to be a steady state, the process 200 may proceed from decision point 206 to block 218.

At block 218, parameters V and γ may be calculated based at least in part on the current fullness value of the playback buffer. In some examples, V may be computed by the following three formulas:

$$V = \frac{\text{content}_{head} - \text{playback}_{head} + (1+p)*(PB_{fVal} - V_{thresh})}{\log\left(\frac{HQ_{Bitrate}}{LQ_{Bitrate}}\right) + \log\left(\frac{SLQ_{Bitrate}}{LQ_{Bitrate}}\right) * \frac{f_{size}(LQ_{Bitrate})}{f_{size}(SLQ_{Bitrate}) - f_{size}(LQ_{Bitrate})}}$$

where $\text{content}_{head}$ is the current run time of the content being streamed (e.g., a live event occurring in real time), $\text{playback}_{head}$ is the current run time of the content being presented for playback at the user device, p is a predefined value $PB_{fVal}$ is the fullness value of the playback buffer, $V_{thresh}$ is a lower threshold value associated with the playback buffer, $HQ_{Bitrate}$ is the highest quality bitrate of the set of available bitrates, $LQ_{Bitrate}$ is the lowest quality bitrate of the set of available bitrates, $SLQ_{Bitrate}$ is the second lowest quality bitrate of the set of available bitrates, and $f_{size}(n)$ is the fragment size of (n).

In some embodiments, γ may be calculated according to the following formula:

$$\gamma = \frac{\text{content}_{head} - \text{playback}_{head} + (1+p)*(PB_{fVal})}{V} - \log\left(\frac{HQ_{Bitrate}}{LQ_{Bitrate}}\right)$$

where $\text{content}_{head}$ is the current run time of the content being streamed (e.g., a live event occurring in real time), $\text{playback}_{head}$ is the current run time of the content being presented for playback at the user device, p is a predefined value $V_{fVal}$ is the fullness value of the playback buffer, $HQ_{Bitrate}$ is the highest quality bitrate of the set of available bitrates, and $LQ_{Bitrate}$ is the lowest quality bitrate of the set of available bitrates.

At block 220, the ABS engine 102 may perform a process for bitrate selection. The bitrate may be determined based at least in part on the current playback buffer fullness value. For example, for each bitrate in the set of bitrates available (e.g., as identified by the source of the content) a goodness value may be computed. In some embodiments, the goodness value may be computed for each bitrate x of the set of bitrates using the follow formula:

$$GVal(x) = \frac{\left(V*\left(\log\left(\frac{x}{LQ_{Bitrate}}\right)+\gamma\right) - (1+p)*PB_{fVal}\right)}{f_{size}(x)}$$

where GVal(x) is the goodness value for the bitrate x, V and γ are calculated using the formulas described above, $LQ_{Bitrate}$ is the lowest quality bitrate of the set of available bitrates (e.g., a set of bitrates in which the content is available), p is a predefined value $PB_{fVal}$ is the fullness value of the playback buffer, and $f_{size}(x)$ is the fragment size (e.g., in byes) of bitrate x. In some embodiments, the ABS engine 102 may rank the set of bitrates according to the goodness values corresponding to each bitrate. A best goodness value (e.g., a highest goodness value in a ranking scheme in which higher values indicate better goodness value) may be selected. If there is no highest goodness value, than the highest bitrate may be selected by default (or any suitable default bitrate).

At block 222, the ABS engine 102 may perform a process for reviewing download progress. In some embodiments, a goodness value for the original bitrate (e.g., the bitrate currently being utilized to download a fragment) may be calculated as follows:

$$GVal(Orig_{Bitrate}) = \frac{\left(V*\left(\log\left(\frac{Orig_{Bitrate}}{LQ_{Bitrate}}\right)+\gamma\right) - (1+p)*PB_{fVal}\right)}{f_{size}(Orig_{Bitrate})*\max\left(1-\text{completed}_{ratio}, \frac{1}{3}\right)}$$

where $GVal(Orig_{Bitrate})$ is the goodness value of the original bitrate, V and γ are calculated as described above, p is a predefined value $PB_{fVal}$ is the fullness value of the playback buffer, $f_{size}(x)$ is the fragment size (e.g., in byes) of bitrate x, $\text{completed}_{ratio}$ is the ratio of completed downloads to incomplete downloads, and max(f, 1) selects the maximum off or 1.

In some embodiments, each of the bitrates that are lower bitrates than the original bitrate may be obtained (e.g., from the formulas discussed above). In some embodiments if the goodness value of a given bitrate x divided by the goodness value of the original bitrate is greater than 1 plus an abandonment threshold, then bitrate x may be eligible for replacing the original download. Said another way, if $$\frac{GVal(x)}{GVal(Orig_{Bitrate})} > (1 + \text{abandon}_{threshold}),$$

then the bitrate x may be utilized to replace the original download. If multiple bitrates can be utilized, a highest goodness value of those bitrates may be selected. In these examples, the ABS engine 102 may be configured to cancel the original download and request, from a source of the content, the content fragment corresponding to the canceled download and the bitrate selected. Else, the download can proceed uninterrupted.

It should be appreciated that the ABS engine 102 may, during performance of block 222 (or at any suitable time) may modify the fullness value corresponding to the playback buffer and/or the virtual buffer. By way of example, when a fragment downloads, the size of the fragment may be added to the playback buffer and its fullness value may be updated. In some embodiments, the By way of example, every time block 212 is performed, the ABS engine 102 may decrement the fullness value of the virtual buffer according to the time elapsed since the last time the process for reviewing download progress was performed to simulate playback during that period. In some embodiments, whenever a fragment download is canceled, the time taken to finish downloading the fragment at the new bitrate is decremented from the fullness value of the virtual buffer to simulate playback during that period. When a fragment finishes download, the fragment duration is added to the virtual buffer size. Specifically, the full fragment duration may be added if playback has not yet started and there was no cancellation. In some embodiments, if playback has started or if there was a cancellation in the RDP process, only half of the fragment duration may be added. The virtual buffer's fullness value may be restricted to be within a range of a minimum value (e.g., 0) and a maximum value (e.g., live_head−download_head+current virtual buffer fullness value).

It should be appreciated that the parameters and goodness values discussed above at 218-222 are also calculated based at least in part on (1) a logarithmic term that takes the logarithm of a bitrate value, (2) a negative linear term that is the current buffer size, and (3) a ratio term that is the fragment size for the given bitrate. As described above, utilizing these particular terms can be highly effective (e.g., for live event streaming). For example, utilizing logarithms allow the functions described above to more closely model the subjective perceived visual quality by an end user in situations when doubling the bitrate does not necessarily result in doubling of the visual quality of a video fragment. By utilizing the actual fragment size when calculating the goodness value for each bitrate the system can make better bitrate decisions (e.g., resulting in overall higher quality and/or reduced buffering) than currently known buffer based approaches (such as BBA) that use simple linear functions.

At decision point 214, it may be decided whether there are more content fragments to be requested. If there are more content fragments (e.g., an index of the current content fragment does not equal an index value corresponding to a last fragment), then the process may return to block 202 where current fullness values for the virtual buffer and the playback buffer may be identified. The process 200 may be repeated any suitable number of times for each content fragment of the content. When there are no more content fragments to be requested, the process 200 may proceed from decision point 214 to block 216 where the process 200 may end.

Figure 3:
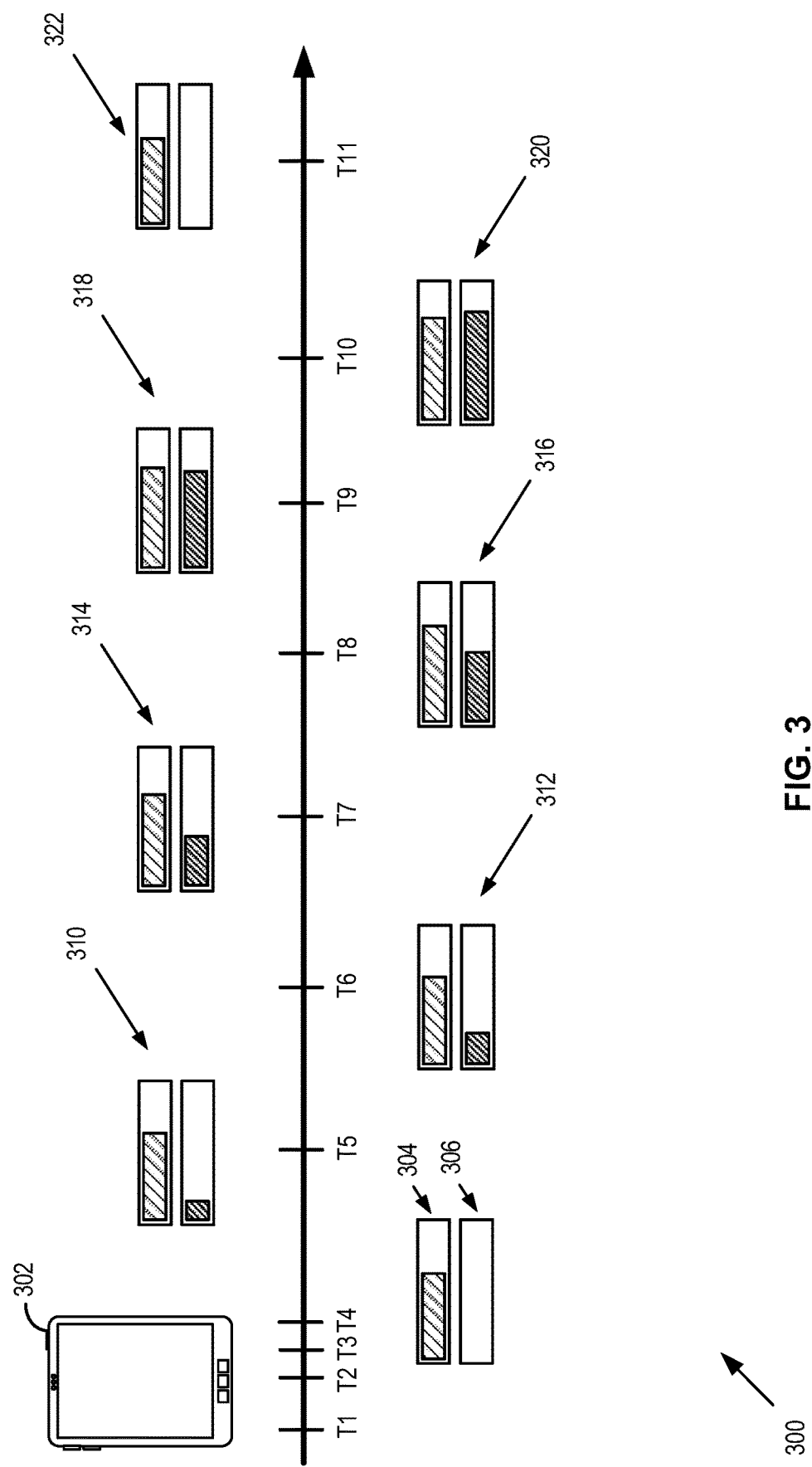
FIG. 3 illustrates an exemplary process illustrating the utilization of a virtual buffer to simulate a playback buffer, in accordance with at least one embodiment.

FIG. 3 illustrates an exemplary process 300 illustrating utilizing a virtual buffer (e.g., the virtual buffer 115 of FIG. 1) to simulate a playback buffer (e.g., the playback buffer 113 of FIG. 1), in accordance with at least one embodiment. The process 300 may begin at time T1, where a live event (referred to in this example as "the content") may begin in real time. The service provider computer(s) 106 of FIG. 1 may transmit content $^{metadata}$ to the user device 302 including a current run time of the live event.

At time T2, the content may be selected for playback via the user device 302 (e.g., the user device 104 of FIG. 1). For example, a user may utilize one or more user interfaces hosted by the service provider computer(s) 106 of FIG. 1 and rendered by the application 108 of FIG. 1 executing on the user device 302, to select a particular instance of content for playback (potentially from an electronic catalog of content available for streaming from the service provider computer(s) 106). The content selected may correspond to the live event.

At time T3, the user device 302 (e.g., the ABS engine 102) may receive content metadata including a current run time of the live event (e.g., the live head), a set of bitrates in which the content is available, or any suitable information corresponding to the live event. In response to receiving the content metadata indicating that the live event has started (e.g., a current run time that is greater than 0), or based at least in part on another suitable stimulus (e.g., in response to selecting the content for playback), the user device 302 (e.g., the ABS engine 102) may set the current state to a transient state and a timer may be initialized indicating a time when playback entered the transient state.

At time T4, the ABS engine 102 may initialize a virtual buffer (e.g., the virtual buffer 115) as depicted at 304. The virtual buffer may be initialized with a fullness value based at least in part on the following formula:

$$VB_{fVal} = \frac{V * f_{size}(m) * \left(\log\left(\frac{\text{bitrate}(n)}{LQ_{Bitrate}}\right) + \gamma\right) - V * f_{size}(n) * \left(\log\left(\frac{\text{bitrate}(n)}{LQ_{Bitrate}}\right) + \gamma\right)}{f_{size}(m) - f_{size}(n)}$$

where $VB_{fVal}$ is the fullness value of the virtual buffer, m is the desired quality starting bitrate, n is the next lower quality bitrate, $LQ_{Bitrate}$ is the lowest quality bitrate, $f_{size}(m)$ is the fragment size of m, $f_{size}(n)$ is the fragment size of n, and where V and γ are calculated by the following formulas:

$$V = \frac{\text{content}_{head} - \text{playback}_{head} + (1+p) * (VB_{fVal} - V_{thresh})}{\log\left(\frac{HQ_{Bitrate}}{LQ_{Bitrate}}\right) + \log\left(\frac{SLQ_{Bitrate}}{LQ_{Bitrate}}\right) * \frac{f_{size}(LQ_{Bitrate})}{f_{size}(SLQ_{Bitrate}) - f_{size}(LQ_{Bitrate})}}$$

$$\gamma = \frac{\text{content}_{head} - \text{playback}_{head} + (1+p) * (VB_{fVal})}{V} - \log\left(\frac{HQ_{Bitrate}}{LQ_{Bitrate}}\right)$$

In some embodiments, the playback buffer (e.g., the playback buffer 113) may be initialized to 0, indicating that the playback buffer is initially empty as depicted at 306. The user device 302 (e.g., the ABS engine 102) may begin performing the process 200 discussed above in connection with FIG. 2. A bitrate may be determined for the next content fragment and the content fragment may be requested (e.g., from the service provider computer(s) 106 of FIG. 1). When the review download progress (RDP) process of block 212 of FIG. 2 is performed (and every time the RDP process is performed) for a fragment download, the fullness value for the virtual buffer (e.g., $VB_{fVal}$) may be decremented by the time elapsed since the last RDP to simulate playback during that period. Since this is the first RDP process execution, the timer is merely updated.

At time T5, in response to the request provided, by the ABS engine 102, the service provider computer(s) 106 may provide the requested fragment (e.g., fragment 1) corresponding to the requested bitrate to the user device 104. In some embodiments, each fragment provided by the service provider computer(s) 106 may include 2 seconds of the content (or another suitable portion of the content corresponding to a different duration). The fragments received by the ABS engine 102 may have a suitable size depending on the particular bitrate utilized by the service provider computer(s) 106 to encode that fragment. For example, a 2-second fragment encoded at a higher bitrate may be larger in size than a 2-second fragment encoded at a lower bitrate. Process 200 of FIG. 2 may once again be executed to determine a bitrate for the next fragment (e.g., fragment 2) to be requested. It may be the case, that the selected bitrate for the fragment 2 is the same bitrate used to download fragment 1. As a result, the download of the fragment 1 may continue and upon completion of the download, fragment 1 may be stored in the playback buffer as depicted at 310. Because there was no download cancellation, the time between the current RDP process execution and the last RDP process execution may be decremented from the virtual buffer to simulate playback during that period.

In some embodiments, the virtual buffer may be updated repeatedly to simulate behavior similar to the playback buffer according to the following exemplary rule set:

1) After initialization of the virtual buffer, ever time the RDP process is executed for a fragment download, the fullness value for the virtual buffer is decremented by the time elapsed since the last RDP to simulate playback during that period and the timer is reinitialized to the time of the current RDP process execution.
2) If there was a download cancellation decision during an RDP, the time taken to finish downloading the fragment at the new bitrate is decremented from the fullness value of the virtual buffer to simulate playback during that period.
3) Whenever a content fragment download is completed, the fragment duration (or a fraction thereof) is added to the fullness value of the virtual buffer. For example,
   a. The full fragment duration may be added to the virtual buffer if playback has not started and there was no download cancellation, or
   b. Only half of the full fragment duration may be added to the virtual buffer if playback has started and/or if there was a cancellation in the RDP process.
4) The virtual buffer fullness value may be restricted based at least in part on calculating a maximum fullness value (e.g., live_head−download_head+current VB fullness value) and a minimum fullness value (e.g., 0).

Thus, process 200 and the process described at T5 may be repeated any suitable number of times corresponding to a number of fragments requested. By way of example, at T6, the process may be repeated and result in an increase in a fullness value of the playback buffer corresponding to the full duration of the downloaded fragment while the fullness value of the virtual buffer may be increased half of the fragment duration. These increased may be depicted at 312. Similarly, at T7, another fragment may be received resulting in similar increases in the fullness values of the corresponding buffers as depicted at 314. Similarly, fragments received at T8, T9, and T10 may result in corresponding increases to the buffers as depicted at 316, 318, and 320, respectively.

When the fullness value of the playback buffer exceeds the fullness value corresponding to the virtual buffer as depicted at 320, the ABS engine 102 may be configured to determine that the playback state is in a steady state and future bitrate selections may be identified utilizing the fullness value of the playback buffer, whereas each bitrate selection identified in response to receiving the fragments at T5-T10 may have utilized the current fullness value of the virtual buffer at the time.

At T11, the ABS engine 102 may receive an indication that the user has selected a user interface option corresponding to a fast forward (or another suitable seek/navigational option provided by the user interface presented via the application 108 of FIG. 1). Based at least in part on receiving this indication, the ABS engine 102 may identify the playback as being in a transient state, and the virtual and playback buffers may be once again initialized (as depicted at 322) in a similar manner as discussed above at T4.

The process discussed above in connection with FIG. 3 may be repeated any suitable number of times where downloaded fragment durations causing increases to the respective fullness values of the buffers, while cancellations and/or time since the last RDP process execution may cause the fullness value of the virtual buffer to decrease, and actual playback at the user device 104 may cause the fullness value of the playback buffer to decrease.

Figure 4:
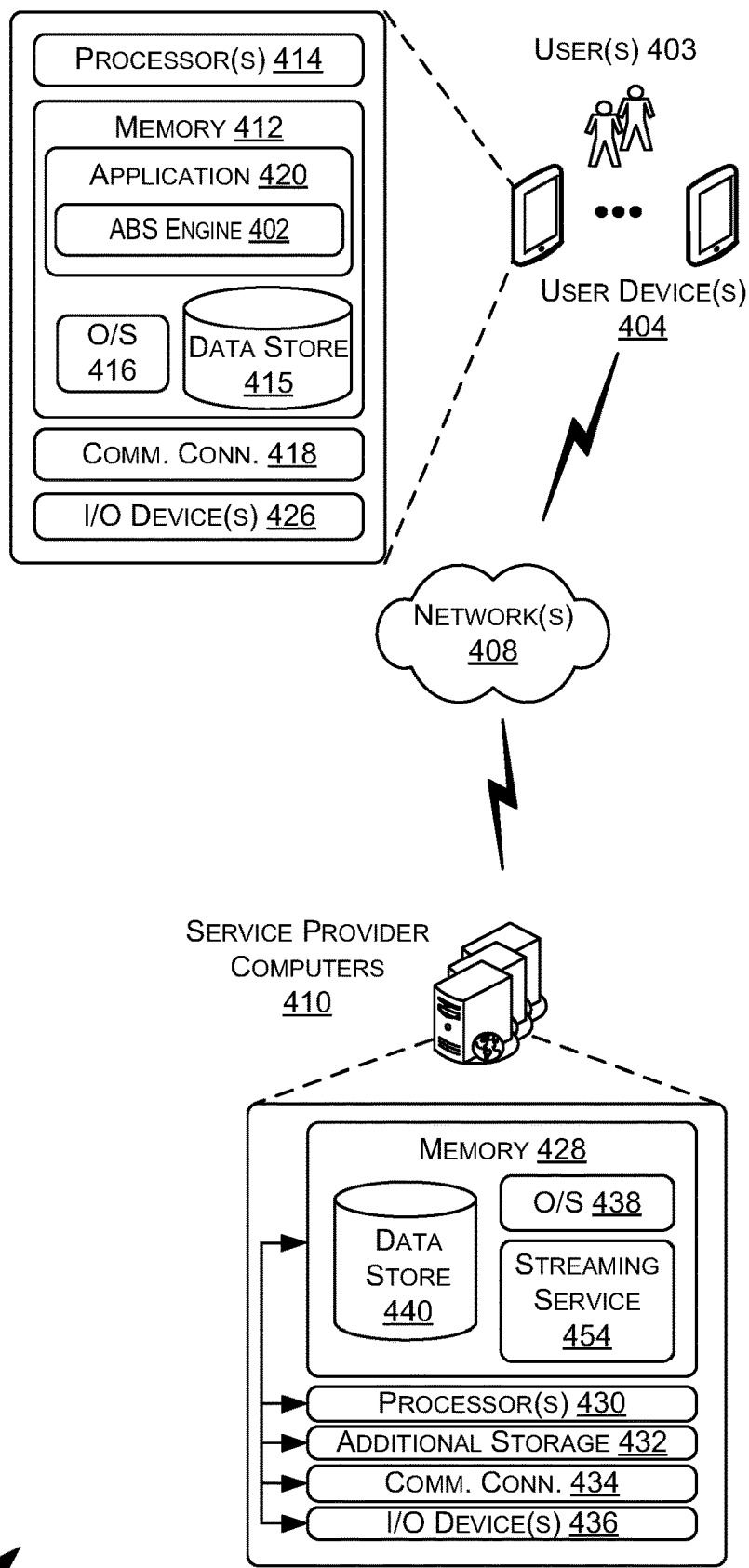
FIG. 4 illustrates an exemplary system for providing adaptive bitrate streaming utilizing an adaptive bitrate streaming engine, in accordance with at least one embodiment.

FIG. 4 illustrates an exemplary system 400 for providing adaptive bitrate streaming utilizing an adaptive bitrate streaming engine (e.g., the ABS engine 102 of FIG. 1), in accordance with at least one embodiment. In system 400, one or more user(s) 403 may utilize a user device (e.g., a user device of a collection of user device(s) 404 to provide input to the service provider computer(s) 410. In some embodiments, a user may access any suitable input/output devices (e.g., I/O devices 426 discussed below) such as a keyboard, a mouse, a touchpad, an accelerometer, and the like, to provide input (e.g., via an application 420 running on the user device(s) 404, via manipulation of the user device(s) 404, etc.) to request content from service provider computer(s) 410 via one or more network(s) 408. By way of example, a user may navigate to an electronic content catalog where he may access any suitable content (e.g., live content). In some embodiments, access to such content may be in accordance with a subscription and/or fee. In some aspects, the application 420 (e.g., a web browser application, a content player application, etc., an application associated with a streaming service, etc.) operating on the user device(s) 404 may be configured to display the content (e.g., streamed content) streamed by service provider computer(s) 410. In some embodiments, the streaming service 454 may host the application 420 such that content provided by the streaming service 454 may be played by the application 420.

In some examples, the network(s) 408 may include any one or a combination of many different types of networks, such as cable networks, the Internet, wireless networks, cellular networks, and other private and/or public networks. While the illustrated example represents the user(s) 406 accessing content over the network(s) 408, the described techniques may equally apply in instances where the user(s) 403 interact with the service provider computer(s) 410 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the adaptive bitrate streaming engine 402 (an example of the adaptive bitrate streaming engine 102 of FIG. 1), discussed further below in more detail, may operate in whole or in part on the user device(s) 404. Thus, in some embodiments, the user(s) 403 may access the functionality of the adaptive bitrate streaming engine 402 directly through the user device(s) 404 and/or the service provider computer(s) 410 via user interfaces provided by the application 420.

In some embodiments, the application 420 be utilized to request content from the service provider computer(s) 410 so as to provide the various functionality described above with respect to the adaptive bitrate streaming engine 602. For example, the application 420 may be a content player configured to play streamed content provided by the streaming service 454. The application 420 may execute the functionality provided by the adaptive bitrate streaming engine 102 including the features described above in connection with FIGS. 1-3. In some embodiments, the application 420 (e.g., a web browser application, a streaming application, etc.) may be configured to convey the user's input(s) and/or some portion of the user's input(s) to the adaptive bitrate streaming engine 102 and/or the service provider computer(s) 410. The application 420 may be configured to receive, process, and present any suitable data received from the service provider computer(s) 410 (e.g., the graphical content described above in connection with FIGS. 1-3.

The service provider computer(s) 410, perhaps arranged in a cluster of servers or as a server farm, may host the application 420 operating on the user device(s) 404 and/or cloud-based software services. Other server architectures may also be used to host the application 420 and/or cloud-based software services. The application 420 operating on the user device(s) 404 may be capable of handling requests from the user(s) 403 and serving, in response, various user interfaces and/or output that can be presented at the user device(s) 404. In some embodiments, the application 420 operating on the user device(s) 404 can present any suitable type of website that supports user interaction. The described techniques can similarly be implemented outside of the application 420, such as with other applications running on the user device(s) 404.

The user device(s) 404 may be any suitable type of computing device such as, but not limited to, a mobile phone, a touch screen device, a smartphone, a personal digital assistant (PDA), a laptop computer, a desktop computer, a tablet PC, an electronic book (e-book) reader, etc. In some examples, the user device(s) 404 may be in communication with the service provider computer(s) 410 via the network(s) 408, or via other network connections.

In one illustrative configuration, the user device(s) 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user computing device, the memory 412 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system 416, one or more data stores 415, and one or more application programs, modules, or services for implementing the features of the adaptive bitrate streaming engine 402 disclosed herein, provided via the application 420. The application 420 may be configured to receive, store, and/or display a network page or other interface for interacting with the service provider computer(s) 410. In some embodiments, the memory 412 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device (e.g., another of the user device(s) 404) or server (e.g., the service provider computer(s) 410), user terminals and/or other devices on the network(s) 408. The user device(s) 404 may also include I/O device(s) 426, such as a keyboard, a mouse, a touch input device, a display, speakers, a printer, an accelerometer, a gyroscope, etc.

In some aspects, the service provider computer(s) 410 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 410 may be in communication with the user device(s) 404 and/or other service providers via the network(s) 408 or via other network connections. The service provider computer(s) 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 410, the memory 428 may be volatile (such as RAM) and/or non-volatile (such as ROM, flash memory, etc.). The service provider computer(s) 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device or server, user terminals and/or other devices on the network(s) 408. The service provider computer(s) 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 438, one or more data stores 440, and/or one or more application programs, modules, or services for implementing the features disclosed herein, such as the features provided by the adaptive bitrate streaming engine 402 (e.g., the adaptive bitrate streaming engine 102 of FIG. 1).

Figure 5:
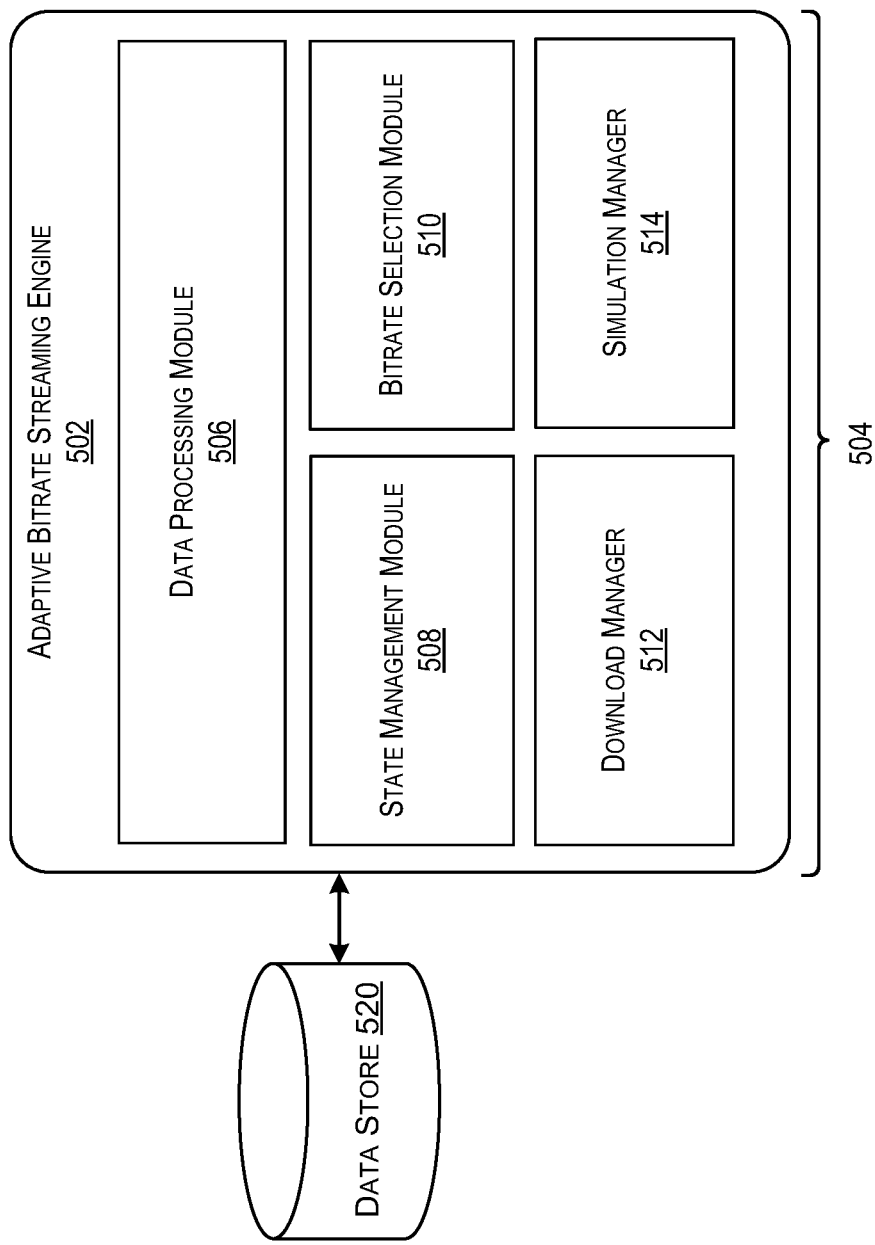
FIG. 5 is a schematic diagram of an example computer architecture for the adaptive bitrate streaming engine, including a plurality of modules that may perform functions in accordance with at least one embodiment.

FIG. 5 is a schematic diagram of an example architecture 500 for the adaptive bitrate streaming (ABS) engine 502, including a plurality of modules 504 that may perform functions in accordance with at least one embodiment. The ABS engine 502 may be an example of the ABS engine 102 of FIG. 1. The modules 504 may be software modules, hardware modules, or a combination thereof. If the modules 504 are software modules, the modules 504 can be embodied on a computer readable medium and processed by a processor in any of the computer systems described herein. The modules 504, or some portion of the modules 504, may be operate as separate modules or the functionality provided by the module 504 may be provided in any suitable manner by a greater or fewer number of modules then the number depicted in FIG. 5.

In the embodiment shown in the FIG. 5, a data store 520 is shown, although data (e.g., content metadata) can be maintained, derived, or otherwise accessed from various data stores, either remote or local to the ABS engine 502, to achieve the functions described herein. In at least one embodiment, the data store 520 may be physically located on the user device 104 of FIG. 1. The ABS engine 502, as shown in FIG. 5, includes various modules 504 such as a data processing module 506, a state management module 508, a bitrate selection module 510, a download manager 512, and a simulation manager 514. Some functions of the modules 504 are described below. However, for the benefit of the reader, a brief, non-limiting description of each of the modules is provided in the following paragraphs. In accordance with at least one embodiment, a process is identifying potential feature combinations for a new item.

In at least one embodiment, the ABS engine 502 includes the data processing module 506. Generally, the data processing module 506 may be utilized to receive and/or transmit any suitable information with respect to any example provided herein. The data processing module 506 may include any suitable number of application programming interfaces (APIs) with which the functionality of the ABS engine 502 may be invoked. In some embodiments, the data processing module 506 may be configured to receive content metadata (e.g., live_head, a maximum number of fragments expected for the content, a duration corresponding to each fragment (e.g., 2 seconds), a total number of fragments associated with the content, a set of available bitrates for the content, a title of the content, a description of the content, or any suitable data associated with the content). The data processing module 506 may be configured to generate a record (e.g., a manifest file) and store the content metadata as part of the record within the data store 520 for subsequent use. The data processing module 506 may execute any suitable function call to invoke the functionality of any other module of the modules 504. In some embodiments, user interface selection made via user interfaces provided by the application 420 of FIG. 4 may be received by the data processing module 506. The data processing module 506 may be configured to update the manifest file with a time at which the user option was selected. A user interface selection indicating the selection of a playback or navigational option (e.g., also referred to as a seek event such as a fast forward, rewind, forward 10 seconds, repeat 10 seconds and the like) may cause the data processing module 506 to invoke the functionality of the state management module 508.

In some embodiments, the state management module 508 may execute any suitable functionality for determining a current state corresponding to the playback of the content at the user device (e.g., the user device 104). By way of example, the state management module 508 may utilize a predefined threshold (e.g., 10 seconds, 5 seconds) to determine whether or not the playback is in a transient state. As a non-limiting example, the state management module 508 may determine the current state of the playback is a first state (e.g., a transient state) if the playback option was selected less than the threshold number of seconds before the current time and so long as the virtual buffer's fullness value exceeds the fullness value corresponding to the playback buffer. In some embodiments, the state management module 508 may determine a time stored in the manifest file that indicates a time at which the user option was selected/ received. The state management module 508 may be configured to compare a current time to the time stored in the manifest file to determine whether the user option was selected within a threshold of the current time. In some embodiments, the state management module 508 may be configured to obtain and compare the fullness values of the virtual buffer and the playback buffer for state determinations. In some embodiments, the functionality performed by the state management module 508 may include the operations discussed above with respect to decision point 206 of FIG. 2. The state management module 508 may pass an indication of the determined state to the bitrate selection module 510.

The bitrate selection module 510 may be configured to perform any suitable operations for identifying a bitrate for a next fragment to be requested from the source of the content (e.g., the service provider computer(s) 410 of FIG. 4). For example, the bitrate selection module 510 may be configured to perform the operations discussed above in connection with blocks 208 and 210 of FIG. 2 (e.g., calculating parameters V and γ based at least in part on the current virtual buffer fullness value and performing a bitrate selection process to select a bitrate for a subsequent content fragment based at least in part on the current virtual buffer fullness value). The bitrate selection module 510 may be configured to perform these operations when the current state of the playback is in a transient state. If the current state of the playback is in a steady state, the bitrate selection module 510 may be configured to perform the operations discussed above in connection with blocks 218 and 220 of FIG. 2 (e.g., calculating parameters V and γ based at least in part on the current playback buffer fullness value and performing a bitrate selection process to select a bitrate for a subsequent content fragment based at least in part on the current playback buffer fullness value). In some embodiments, the bitrate selection module 510 may be configured to update a record (e.g., a manifest file) to indicate what bitrate was requested for each content fragment requested. The bitrate values stored in the manifest file may be utilized by the download manager 512 to determine whether the bitrate has changed between the bitrate used to request a currently downloading content fragment and the bitrate to be utilized for the next content fragment. The bitrate selection module 510 may be configured to invoke the functionality of the download manager 512.

The download manager 512 may be configured to perform the operations discussed above in connection with block 212 when the current state of the playback is in the transient state. If the current state of the playback is in the steady state, the download manager 512 may be configured to perform the operations of block 222 of FIG. 2. In some embodiments, the download manager 512 (or any suitable module of the module 504) may invoke the functionality of the simulation manager 514. In some embodiments, the download manager 512, may utilize the data contained in the manifest file (e.g., the bitrates utilized to request each content fragment) and stored in the data store 520 to determine if the bitrate has changed based at least in part on comparing the bitrate used to request a currently downloading content fragment and the bitrate to be utilized for the next content fragment. In some embodiments, the download manager 512 may be configured to update a time in the manifest file corresponding to a current execution time at which the download manager 512 began executing the operations of an RDP process. If the manifest contains a time of the last RDP process execution, the download manager 512 may be configured to determine a difference between the last execution time of the last RDP process and the current execution time of the RDP process. The difference value quantifying the amount of time elapsed between the two execution times may be stored in the manifest file by the download manager 512.

In some embodiments, the simulation manager 514 may be configured to perform any suitable operations for updating the fullness value of the virtual buffer in order to simulate the similar behavior as the playback buffer during playback. By way of example, the simulation manager 514 may be configured to perform operations to cause the fullness value corresponding to the virtual buffer to be modified according to a predetermined rule set. The predetermined rule set may include a set of rules such as the following:

1) After initialization of the virtual buffer, ever time the RDP process is executed for a fragment download, the fullness value for the virtual buffer is decremented by the time elapsed since the last RDP to simulate playback during that period and the timer is reinitialized to the time of the current RDP process execution.
2) If there was a download cancellation decision during an RDP, the time taken to finish downloading the fragment at the new bitrate is decremented from the fullness value of the virtual buffer to simulate playback during that period.
3) Whenever a content fragment download is completed, the fragment duration (or a fraction thereof) is added to the fullness value of the virtual buffer. For example,
    a. The full fragment duration may be added to the virtual buffer if playback has not started and there was no download cancellation, or
    b. Only half of the full fragment duration may be added to the virtual buffer if playback has started and/or if there was a cancellation in the RDP process.
4) The virtual buffer fullness value may be restricted based at least in part on calculating a maximum fullness value (e.g., live_head−download_head+current VB fullness value) and a minimum fullness value (e.g., 0).

It should be appreciated that the actual rule set utilized by the simulation manager 514 may include more or less rules as those described above. The simulation manager 514 may be configured to access content metadata, RDP execution times, live_head, download_head, or any suitable information stored in the manifest file to perform the operations for updating the fullness value of the virtual buffer.

In some embodiments, when a download has completed, the download manager 512 may be configured to invoke the functionality of the state management module 508. This may be performed any suitable number of times corresponding to a number of fragments remaining in the content that have yet to be requested in this session (e.g., in the time since the last playback option and/or navigational option was selected).

Figure 6:
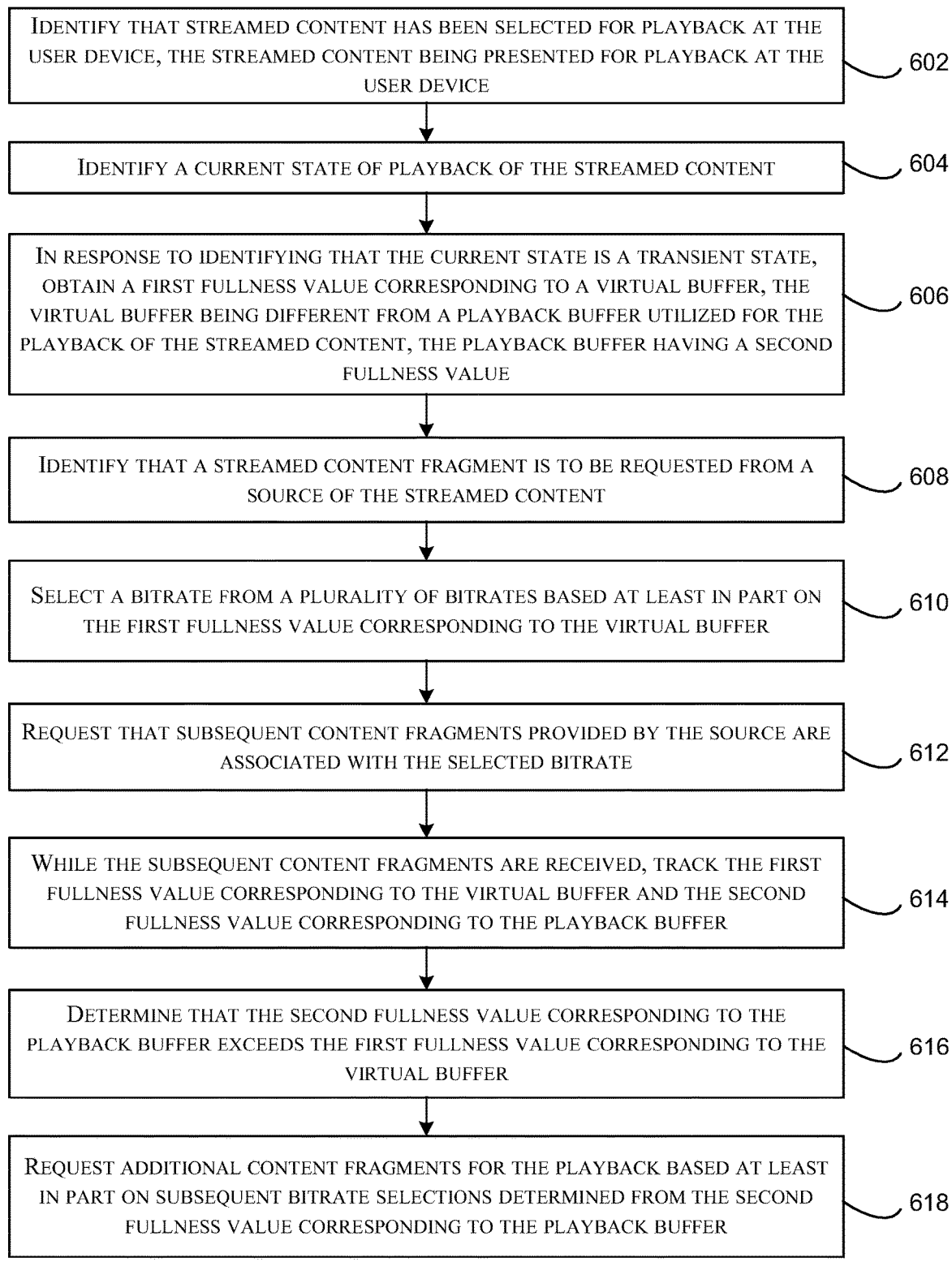
FIG. 6 is a flowchart illustrating an example method for providing adaptive bitrate streaming, in accordance with at least one embodiment.

FIG. 6 is a flowchart illustrating an example method 600 for providing adaptive bitrate streaming, in accordance with at least one embodiment. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by any suitable combination of the modules 504 of the ABS engine 502 of FIG. 5 which may operate in whole or in part on a user device (e.g., one or more of the user device(s) 404 of FIG. 4).

The method 600 may begin at 602, where the ABS engine 502 may identify that streamed content has been selected for playback at the user device. For example, the data processing module 506 of the ABS engine 502 may receive an indication that a user interface option (e.g., a button) that is associated with playback of the content has been selected. In some embodiments, the streamed content may be presented for playback at the user device in response to the selection of the user interface option. In some embodiments, the data processing module 506 may store a timestamp (e.g., in a record corresponding to the content) indicating a time at which the indication that the user interface option was received. This time may be considered a last time a user interface option was selected.

At 604, a current state of the playback of the streamed content may be identified. By way of example, the state management module 508 may identify a timestamp (e.g., a timestamp stored in a record of data store 520 that corresponds to the content), the timestamp may indicate a last time a user interface option (e.g., either a user interface option for playback or navigation) was selected. The state management module 508 may further identify a fullness value corresponding to a virtual buffer and a playback buffer. If the virtual buffer and/or the playback buffer are not yet instantiated and/or initialized, the state management module 508 may determine, based at least in part on the timestamp and the lack of virtual/playback buffer(s) and/or initialization of such buffers, that the current state is a transient state. The state management module 508 may generate and/or initialize the virtual buffer to indicate a non-zero fullness value according to the formula discussed above in connection with FIG. 3 and the playback buffer may be initialized to 0 (e.g., indicating the playback buffer is empty).

At 606, in response to identifying that the current state is a transient state, a first fullness value corresponding to a virtual buffer may be obtained (e.g., by the bitrate selection module 510). In some embodiments, the virtual buffer being different from a playback buffer utilized for the playback of the streamed content, the playback buffer having a second fullness value.

At 608, the bitrate selection module 510 may identify that a streamed content fragment is to be requested from a source of the streamed content. This identification may be based at least in part on determining that the user interface element was selected and no content fragments are currently being downloaded (e.g., received).

At 610, the bitrate selection module 510 may select a bitrate from a plurality of bitrates based at least in part on the first fullness value corresponding to the virtual buffer. By way of example, the bitrate selection module 510 may execute the operations discussed above corresponding to blocks 208 and 210 of FIG. 2. These operations may include calculating goodness values for each of the plurality of bitrates and selecting a best bitrate based at least in part on those goodness values (e.g., select a bitrate that corresponds to a highest goodness value).

At 612, the bitrate selection module 510 may be configured to request (e.g., from the service provider computer(s) 410 of FIG. 4, a source of the content) that subsequent content fragments provided by the source are associated with the selected bitrate. This request may include any suitable data such as a fragment index indicative of a particular content fragment and an indicator of the bitrate selected.

At 614, while the subsequent content fragments are received, the state management module 508 may track the first fullness value corresponding to the virtual buffer and the second fullness value corresponding to the playback buffer. As functionality of the download manager 512 and simulation manager 514 are performed, the fullness values corresponding to the virtual buffer and/or the playback buffer may fluctuate. The state management module 508 may be configured to monitor these fullness values.

At 616, the state management module 508 may determine that the second fullness value corresponding to the playback buffer exceeds the first fullness value corresponding to the virtual buffer. When the state management module 508 detects this condition, the state management module 508 may identify the current state of the playback as being in a steady state.

At 618, the bitrate selection module 510 may request additional content fragments for the playback based at least in part on subsequent bitrate selections determined from the second fullness value corresponding to the playback buffer. Said another way, the bitrate selection module 510 may perform the operations of blocks 218 and 220 of FIG. 2 based at least in part on the determination made at 616.

Figure 7:
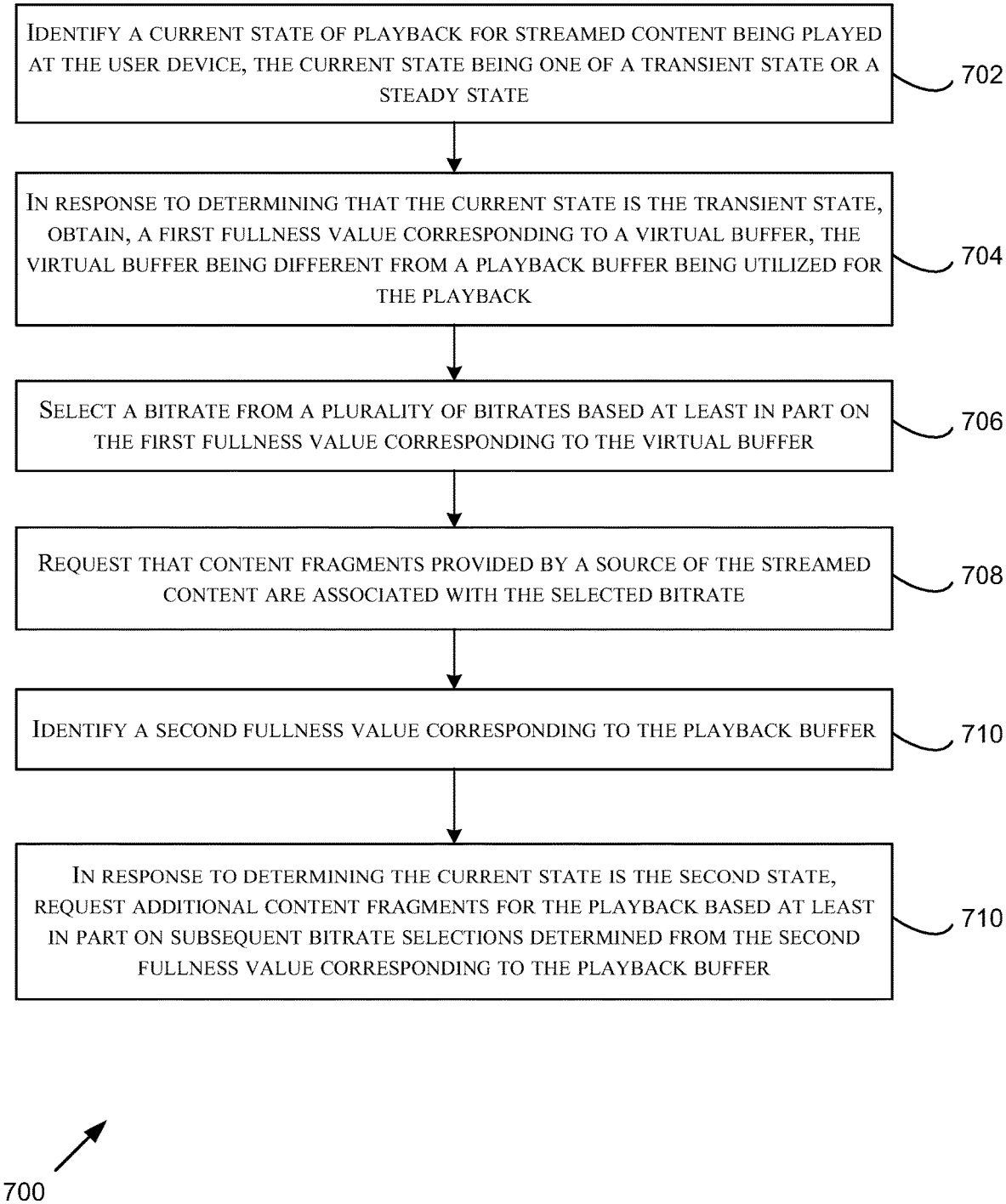
FIG. 7 is another flowchart illustrating another example method for providing adaptive bitrate streaming, in accordance with at least one embodiment.

FIG. 7 is another flowchart illustrating another example method 700 for providing adaptive bitrate streaming, in accordance with at least one embodiment. It should be appreciated that the method 700 by a user device (e.g., user device 104 of FIG. 1) comprising one or more processors and one or more computer-readable memories comprising executable instructions that, when executed by the one or more processors, cause the user device to perform the operations of method 700. The operations of the method 700 may be performed in any suitable, not necessarily the order depicted in FIG. 7. Further, the method 600 may include additional, or fewer operations than those depicted in FIG. 6. The operations of method 600 may be performed by any suitable combination of the modules 504 of the ABS engine 502 of FIG. 5 which may operate in whole or in part on a user device (e.g., one or more of the user device(s) 404 of FIG. 4).

The method 700 may begin at 702, a current state of playback for streamed content being played at the user device may be identified. In some examples, the current state may be one of a transient state or a steady state. In some embodiments, the state management module 508 of FIG. 1, a component of the ABS engine 502 may identify a timestamp associated with the content that indicates a last time that a user interface option corresponding to the content (e.g., either a user interface option for playback or navigation) was selected. The state management module 508 may further identify a fullness value corresponding to a virtual buffer and a playback buffer. If the virtual buffer and/or the playback buffer are not yet instantiated and/or initialized, the state management module 508 may determine, based at least in part on the timestamp and the lack of virtual/playback buffer(s) and/or initialization of such buffers, that the current state is a transient state. The state management module 508 may generate and/or initialize the virtual buffer to indicate a non-zero fullness value according to the formula discussed above in connection with FIG. 3 and the playback buffer may be initialized to 0 (e.g., indicating the playback buffer is empty). If the buffers are initiated, the state management module 508 may identify the current state of the playback based at least in part on a comparison of the fullness value of the virtual buffer and the fullness value of the playback buffer.

At 704, in response to determining that the current state is the transient state, a first fullness value corresponding to a virtual buffer may be obtained (e.g., by the bitrate selection module 510). The virtual buffer being different from a playback buffer being utilized for the playback.

At 706, a bitrate may be selected (e.g., by the bitrate selection module 510) from a plurality of bitrates based at least in part on the first fullness value corresponding to the virtual buffer. By way of example, the bitrate selection module 510 may execute the operations of blocks 208 and 210 of FIG. 2.

At 708, the user device (e.g., the bitrate selection module 510) may request that content fragments provided by a source of the streamed content (e.g., the service provider computer(s) 502 of FIG. 5) are associated with the selected bitrate. The request can be in any suitable form. In some embodiments, the request can include an index identifying the particular content fragment being requested, an index of the last content fragment received, an indicator of the bitrate requested, or any suitable data with which a content fragment can be requested.

At 710, the user device (e.g., the state management module 508) may identify a second fullness value corresponding to the playback buffer. In some embodiments, the state management module 508 may identify the second fullness value after the next content fragment has been requested.

At 712, in response to determining (e.g., by the state management module 508) that the current state is the steady state, additional content fragments for the playback may be requested (e.g., by the bitrate selection module 510) based at least in part on subsequent bitrate selections determined from the second fullness value corresponding to the playback buffer. Said another way, the bitrate selection module 510 may execute the operations discussed above in connection with blocks 218 and 220 of FIG. 2.

Figure 8:
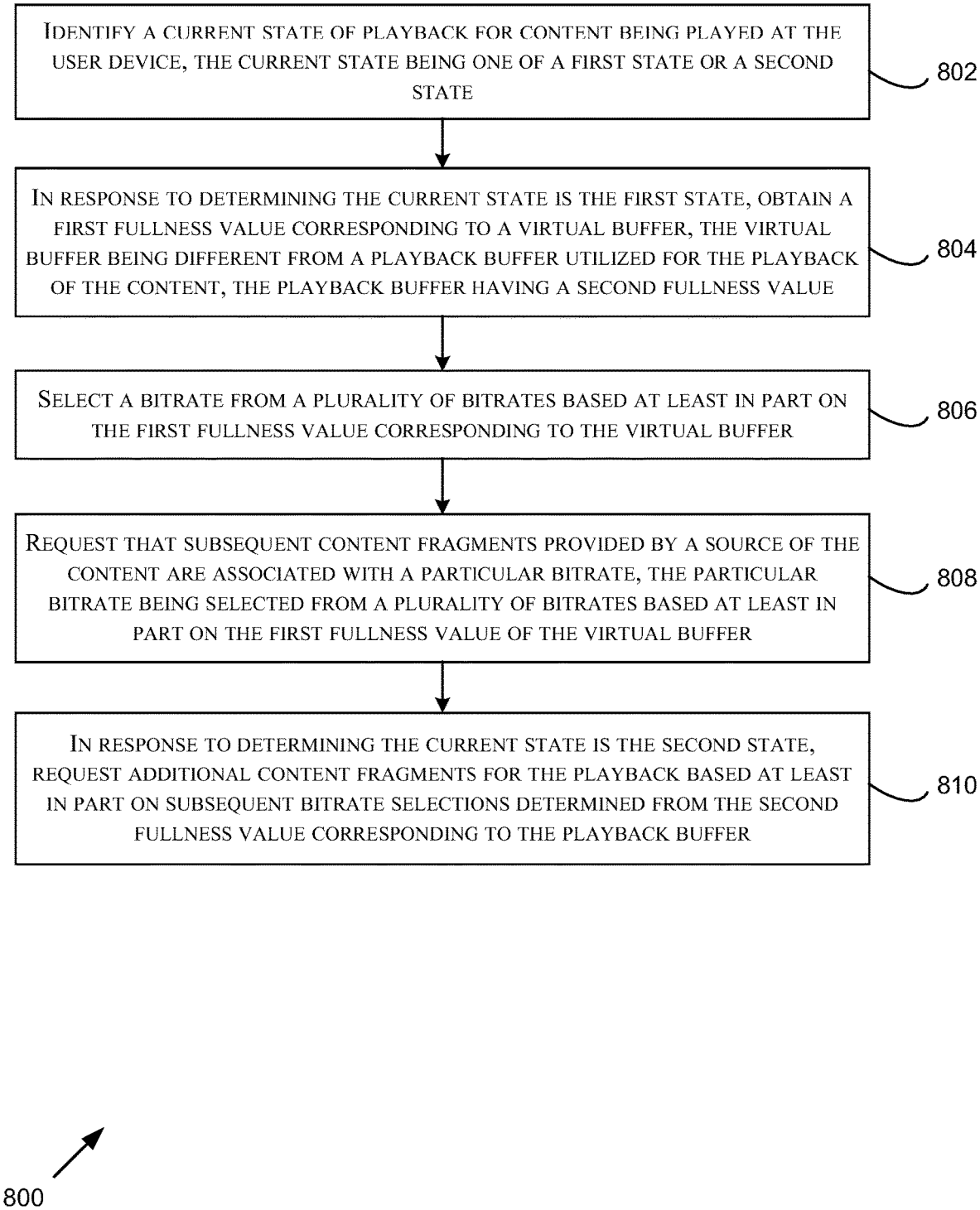
FIG. 8 is yet another flowchart illustrating yet another example method for providing adaptive bitrate streaming, in accordance with at least one embodiment.

FIG. 8 is yet another flowchart illustrating yet another example method 800 for providing adaptive bitrate streaming, in accordance with at least one embodiment. The method 800 may be executed by a user device having a computer-readable storage medium comprising executable instructions that, upon execution by one or more processors, cause the user device to perform the operations of method 800. The operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 504 of the ABS engine 502 of FIG. 5 which may operate in whole or in part on a user device (e.g., one or more of the user device(s) 404 of FIG. 4).

The method 800 may begin at 802, a current state of playback for content being played at the user device may be identified. In some embodiments, the current state may be one of a first state (e.g., a transient state) or a second state (e.g., a steady state). In some embodiments, the state management module 508 of FIG. 1, a component of the ABS engine 502 may identify a timestamp associated with the content that indicates a last time that a user interface option corresponding to the content (e.g., either a user interface option for playback or navigation) was selected. The state management module 508 may further identify a fullness value corresponding to a virtual buffer and a playback buffer. If the virtual buffer and/or the playback buffer are not yet instantiated and/or initialized, the state management module 508 may determine, based at least in part on the timestamp and the lack of virtual/playback buffer(s) and/or initialization of such buffers, that the current state is a transient state. The state management module 508 may generate and/or initialize the virtual buffer to indicate a non-zero fullness value according to the formula discussed above in connection with FIG. 3 and the playback buffer may be initialized to 0 (e.g., indicating the playback buffer is empty). If the buffers have been previously initiated, the state management module 508 may identify the current state of the playback based at least in part on a comparison of the fullness value of the virtual buffer and the fullness value of the playback buffer.

At 804, in response to determining that the current state is the first state, a first fullness value corresponding to a virtual buffer may be obtained (e.g., by the bitrate selection module 510). The first fullness value may quantify an amount of simulated data being stored in a theoretical buffer. The virtual buffer may be different from a playback buffer being utilized for the playback. The playback buffer may be a storage container and a second fullness value associated with the playback buffer may indicate an amount of data stored in the playback buffer.

At 806, a bitrate may be selected (e.g., by the bitrate selection module 510) from a plurality of bitrates based at least in part on the first fullness value corresponding to the virtual buffer. By way of example, the bitrate selection module 510 may execute the operations of blocks 208 and 210 of FIG. 2.

At 808, the user device (e.g., the bitrate selection module 510) may request that content fragments provided by a source of the streamed content (e.g., the service provider computer(s) 502 of FIG. 5) are associated with the selected bitrate. The request can be in any suitable form. In some embodiments, the request can include an index identifying the particular content fragment being requested, an index of the last content fragment received, an indicator of the bitrate requested, or any suitable data with which a content fragment can be requested. In some embodiments, the particular bitrate may be selected (e.g., by the bitrate selection module 510) from the plurality of bitrates based at least in part on the fullness value of the virtual buffer as described in blocks 208 and 210 of FIG. 2.

At 810, in response to determining (e.g., by the state management module 508) that the current state is the steady state, additional content fragments for the playback may be requested (e.g., by the bitrate selection module 510) based at least in part on subsequent bitrate selections determined from the second fullness value corresponding to the playback buffer. Said another way, the bitrate selection module 510 may execute the operations discussed above in connection with blocks 218 and 220 of FIG. 2.

The various embodiments discussed above can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

Embodiments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying, by a user device, that streamed content has been selected for playback at the user device, the streamed content being presented for playback at the user device;
    identifying, by the user device, a current state of playback of the streamed content;
    in response to identifying that the current state is a transient state, obtaining, by the user device, a first fullness value corresponding to a virtual buffer, the virtual buffer being different from a playback buffer utilized for the playback of the streamed content, the playback buffer having a second fullness value;
    identifying, by the user device, that a streamed content fragment is to be requested from a source of the streamed content;
    selecting, by the user device, a bitrate from a plurality of bitrates based at least in part on the first fullness value corresponding to the virtual buffer;
    requesting, by the user device, that subsequent content fragments provided by the source are associated with the selected bitrate;
    while the subsequent content fragments are received, tracking, by the user device, the first fullness value corresponding to the virtual buffer and the second fullness value corresponding to the playback buffer;
    determining, by the user device, that the second fullness value corresponding to the playback buffer exceeds the first fullness value corresponding to the virtual buffer; and
    requesting, by the user device, additional content fragments for the playback based at least in part on subsequent bitrate selections determined from the second fullness value corresponding to the playback buffer.

2. The computer-implemented method of claim 1, further comprising:
    calculating goodness values for each of the plurality of bitrates, the goodness values being based at least in part on the first fullness value corresponding to the virtual buffer; and
    ranking the plurality of bitrates based at least in part on the goodness values, wherein the bitrate is selected from the plurality of bitrates based at least in part on the ranking.

3. The computer-implemented method of claim 2, wherein calculating the goodness values is further based at least in part on a logarithmic function and a fragment size associated with each bitrate.

4. The computer-implemented method of claim 1, wherein the additional content fragments for the playback are requested in response to determining that the current state is a steady state.

5. The computer-implemented method of claim 1, wherein the virtual buffer is initialized based at least in part on a predefined fullness value.

6. The computer-implemented method of claim 1, wherein the first fullness value of the virtual buffer is adjusted to simulate at least one behavioral aspect of the playback buffer.

7. The computer-implemented method of claim 1, further comprising:
    calculating subsequent goodness values for each of the plurality of bitrates, the subsequent goodness values being based at least in part on the second fullness value corresponding to the playback buffer, at least one logarithmic function, and corresponding fragment sizes of the plurality of bitrates; and
    ranking the plurality of bitrates based at least in part on the subsequent goodness values, wherein the subsequent bitrate selections are further based at least in part on the ranking.

8. A user device, comprising:
    one or more processors; and
    one or more computer-readable memories comprising executable instructions that, when executed by the one or more processors, cause the user device to:
        identify a current state of playback for streamed content being played at the user device, the current state being one of a transient state or a steady state;
        in response to determining that the current state is the transient state, obtain, a first fullness value corresponding to a virtual buffer, the virtual buffer being different from a playback buffer being utilized for the playback;
        select a bitrate from a plurality of bitrates based at least in part on the first fullness value corresponding to the virtual buffer;
        request that content fragments provided by a source of the streamed content are associated with the selected bitrate;
        identify a second fullness value corresponding to the playback buffer; and
        in response to determining that the current state has transitioned to the steady state, request additional content fragments for the playback based at least in part on subsequent bitrate selections determined from the second fullness value corresponding to the playback buffer.

9. The user device, of claim 8, wherein the first fullness value indicates simulated storage and removal of received content fragments, wherein the second fullness value indicates an amount of actual data currently stored in the playback buffer.

10. The user device, of claim 8, wherein determining the current state is in the steady state is based at least in part on determining that the second fullness value exceeds the first fullness value.

11. The user device, of claim 8, wherein executing the executable instructions causes the user device to adjust the first fullness value corresponding to the virtual buffer based at least in part on a download progress of a requested content fragment and a length of time corresponding to queued content fragments.

12. The user device, of claim 8, wherein executing the executable instructions causes the user device to:
   receive content fragments from the source in the selected bitrate; and
   while the content fragments are being received, incrementally identify a subsequent fullness value for the playback buffer.

13. The user device, of claim 8, wherein the first fullness value is adjusted to simulate queuing the received content fragments, the queuing as simulated indicating a smaller amount of data added to the virtual buffer than a size of the received content fragments as queued in the playback buffer.

14. A non-transitory computer-readable storage medium comprising executable instructions that, upon execution by one or more processors, cause a user device to perform operations comprising:
   identifying a current state of playback for content being played at the user device, the current state being one of a first state or a second state;
   in response to determining the current state is the first state, obtaining a first fullness value corresponding to a virtual buffer, the virtual buffer being different from a playback buffer utilized for the playback of the content, the playback buffer having a second fullness value;
   selecting a bitrate from a plurality of bitrates based at least in part on the first fullness value corresponding to the virtual buffer;
   requesting that subsequent content fragments provided by a source of the content are associated with a particular bitrate, the particular bitrate being selected from a plurality of bitrates based at least in part on the first fullness value of the virtual buffer; and
   in response to determining the current state has transitioned to the second state, requesting additional content fragments for the playback based at least in part on subsequent bitrate selections determined from the second fullness value corresponding to the playback buffer.

15. The non-transitory computer-readable storage medium of claim 14, wherein identifying the current state of playback for the content is based at least in part on identifying a most-recent time a user option was selected at the user device, the user option corresponding to playing the content or corresponding to navigating within the content.

16. The non-transitory computer-readable storage medium of claim 15, wherein the current state is identified as being the first state when the most-recent time the user option was selected is within a threshold range of a current time.

17. The non-transitory computer-readable storage medium of claim 14, adjusting the virtual buffer according to a predetermined rule set, wherein adjusting the virtual buffer according to the predetermined rule set causes the first fullness value of the virtual buffer to increase at a lesser rate than a rate at which the second fullness value of the playback buffer increases in response to queuing content fragments.

18. The non-transitory computer-readable storage medium of claim 14, wherein executing the executable instructions causes the user device to perform additional operations comprising:
   selecting the particular bitrate from the plurality of bitrates;
   determine if a download is in progress for one or more content fragments; and
   cancel the download for the one or more content fragments based at least in part on the particular bitrate selected and corresponding bitrates of the one or more content fragments.

19. The non-transitory computer-readable storage medium of claim 14, wherein selecting the bitrate from the plurality of bitrates is further based at least in part on corresponding fragments sizes of the plurality of bitrates.

20. The non-transitory computer-readable storage medium of claim 14, wherein selecting the bitrate from the plurality of bitrates is further based at least in part on utilizing a logarithmic function to calculate goodness values for each of the plurality of bitrates, wherein the bitrate is selected based at least in part on the goodness values.

* * * * *